United States Patent
Raichelgauz et al.

(10) Patent No.: US 9,466,068 B2
(45) Date of Patent: Oct. 11, 2016

(54) SYSTEM AND METHOD FOR DETERMINING A PUPILLARY RESPONSE TO A MULTIMEDIA DATA ELEMENT

(71) Applicant: Cortica, Ltd., Ramat Gan (IL)

(72) Inventors: Igal Raichelgauz, New York, NY (US); Karina Odinaev, New York, NY (US); Yehoshua Y. Zeevi, Haifa (IL)

(73) Assignee: Cortica, Ltd., Tel Aviv (IL)

( * ) Notice: Subject to any disclaimer, the term of this patent is extended or adjusted under 35 U.S.C. 154(b) by 0 days.

(21) Appl. No.: 14/621,653

(22) Filed: Feb. 13, 2015

(65) Prior Publication Data

US 2015/0161213 A1    Jun. 11, 2015

Related U.S. Application Data

(63) Continuation-in-part of application No. 14/013,636, filed on Aug. 29, 2013, now Pat. No. 9,372,940, which is a continuation-in-part of application No. 13/602,858, filed on Sep. 4, 2012, now Pat. No.

(Continued)

(30) Foreign Application Priority Data

Oct. 26, 2005    (IL) .......................... 171577
Jan. 29, 2006    (IL) .......................... 173409
Aug. 21, 2007    (IL) .......................... 185414

(51) Int. Cl.
  *G06K 9/00*   (2006.01)
  *G06Q 30/02*  (2012.01)
  *G06F 17/30*  (2006.01)

(52) U.S. Cl.
  CPC ....... *G06Q 30/0241* (2013.01); *G06F 17/3002* (2013.01)

(58) Field of Classification Search
  None
  See application file for complete search history.

(56) References Cited

U.S. PATENT DOCUMENTS 4,972,363 A    11/1990   Nguyen et al.
5,806,061 A    9/1998    Chaudhuri et al.
(Continued)

FOREIGN PATENT DOCUMENTS

WO    0231764      4/2002
WO    2007049282   5/2007

OTHER PUBLICATIONS

International Search Authority: International Preliminary Report on Patentability (Chapter I of the Patent Cooperation Treaty) including "Written Opinion of the International Searching Authority" (PCT Rule 43bis. 1) for the related International Patent Application No. PCT/IL2006/001235; Date of Issuance: Jul. 28, 2009.

(Continued)

*Primary Examiner* — Nancy Bitar
(74) *Attorney, Agent, or Firm* — M&B IP Analysts, LLC

(57) ABSTRACT

A method for determining a pupillary response to a multimedia data element viewed through a user computing device. The method comprises receiving a first image of a viewer's pupil captured prior to display of the MMDE over the user computing device; receiving a second image of a viewer's pupil captured after the display of the MMDE over the user computing device; determining, using the first image and the second image, if the viewer's pupil has been dilated; querying a deep-content-classification system to find a match between at least one concept structure and the at least second image of the user's pupil; upon identification of at least one matching concept, receiving a first set of metadata related to the at least one matching concept structure; determining the viewer's attention to the displayed MMDE respective of the first set of metadata; associating the at least one MMDE with the determined user attention.

19 Claims, 9 Drawing Sheets

Related U.S. Application Data 8,868,619, which is a continuation of application No. 12/603,123, filed on Oct. 21, 2009, now Pat. No. 8,266,185, which is a continuation-in-part of application No. 12/084,150, filed on Apr. 7, 2009, now Pat. No. 8,655,801, and a continuation-in-part of application No. 12/195,863, filed on Aug. 21, 2008, now Pat. No. 8,326,775, which is a continuation-in-part of application No. 12/084,150, filed as application No. PCT/IL2006/001235 on Oct. 26, 2006, now Pat. No. 8,655,801, said application No. 12/603,123 is a continuation-in-part of application No. 12/348,888, filed on Jan. 5, 2009, which is a continuation-in-part of application No. 12/084,150, and a continuation-in-part of application No. 12/195,863, said application No. 12/603,123 is a continuation-in-part of application No. 12/538,495, filed on Aug. 10, 2009, now Pat. No. 8,312,031, which is a continuation-in-part of application No. 12/084,150, filed as application No. PCT/IL2006/001235 on Oct. 26, 2006, said application No. 12/538,495 is a continuation-in-part of application No. 12/195,863, and a continuation-in-part of application No. 12/348,888.

(60) Provisional application No. 61/939,289, filed on Feb. 13, 2014.

(56) References Cited

U.S. PATENT DOCUMENTS

| | | | |
|---|---|---|---|
| 5,852,435 A | 12/1998 | Vigneaux et al. |
| 5,870,754 A | 2/1999 | Dimitrova et al. |
| 5,887,193 A | 3/1999 | Takahashi et al. |
| 5,940,821 A | 8/1999 | Wical |
| 5,978,754 A | 11/1999 | Kumano |
| 5,987,454 A | 11/1999 | Hobbs |
| 6,038,560 A | 3/2000 | Wical |
| 6,052,481 A | 4/2000 | Grajski et al. |
| 6,076,088 A | 6/2000 | Paik et al. |
| 6,122,628 A | 9/2000 | Castelli et al. |
| 6,128,651 A | 10/2000 | Cezar |
| 6,147,636 A | 11/2000 | Gershenson |
| 6,240,423 B1 | 5/2001 | Hirata |
| 6,243,375 B1 | 6/2001 | Speicher |
| 6,363,373 B1 | 3/2002 | Steinkraus |
| 6,381,656 B1 | 4/2002 | Shankman |
| 6,411,229 B2 | 6/2002 | Kobayashi |
| 6,422,617 B1 | 7/2002 | Fukumoto et al. |
| 6,493,692 B1 | 12/2002 | Kobayashi et al. |
| 6,493,705 B1 | 12/2002 | Kobayashi et al. |
| 3,524,861 A1 | 2/2003 | Anderson |
| 6,523,022 B1 | 2/2003 | Hobbs |
| 6,526,400 B1 | 2/2003 | Takata et al. |
| 6,560,597 B1 | 5/2003 | Dhillon et al. |
| 6,594,699 B1 | 7/2003 | Sahai et al. |
| 6,601,060 B1 | 7/2003 | Tomaru |
| 6,611,628 B1 | 8/2003 | Sekiguchi et al. |
| 6,611,837 B2 | 8/2003 | Schreiber |
| 6,618,711 B1 | 9/2003 | Ananth |
| 6,643,620 B1 | 11/2003 | Contolini et al. |
| 6,643,643 B1 | 11/2003 | Lee et al. |
| 6,665,657 B1 | 12/2003 | Dibachi |
| 6,675,159 B1 | 1/2004 | Lin et al. |
| 6,728,706 B2 | 4/2004 | Aggarwal et al. |
| 6,751,363 B1 | 6/2004 | Natsev et al. |
| 6,751,613 B1 | 6/2004 | Lee et al. |
| 6,754,435 B2 | 6/2004 | Kim |
| 6,763,519 B1 | 7/2004 | McColl et al. |
| 6,774,917 B1 | 8/2004 | Foote et al. |
| 6,804,356 B1 | 10/2004 | Krishnamachari |
| 6,819,797 B1 | 11/2004 | Smith et al. |
| 6,836,776 B2 | 12/2004 | Schreiber |
| 6,845,374 B1 | 1/2005 | Oliver et al. |
| 6,901,207 B1 | 5/2005 | Watkins |
| 6,970,881 B1 | 11/2005 | Mohan et al. |
| 6,978,264 B2 | 12/2005 | Chandrasekar et al. |
| 7,006,689 B2 | 2/2006 | Kasutani |
| 7,013,051 B2 | 3/2006 | Sekiguchi et al. |
| 7,020,654 B1 | 3/2006 | Najmi |
| 7,043,473 B1 | 5/2006 | Rassool et al. |
| 7,047,033 B2 | 5/2006 | Wyler |
| 7,124,149 B2 | 10/2006 | Smith et al. |
| 7,199,798 B1 | 4/2007 | Echigo et al. |
| 7,260,564 B1 | 8/2007 | Lynn et al. |
| 7,296,012 B2 | 11/2007 | Ohashi |
| 7,302,117 B2 | 11/2007 | Sekiguchi et al. |
| 7,313,805 B1 | 12/2007 | Rosin et al. |
| 7,340,458 B2 | 3/2008 | Vaithilingam et al. |
| 7,346,629 B2 | 3/2008 | Kapur et al. |
| 7,353,224 B2 | 4/2008 | Chen et al. |
| 7,376,672 B2 | 5/2008 | Weare |
| 7,376,722 B1 | 5/2008 | Sim et al. |
| 7,392,238 B1 | 6/2008 | Zhou et al. |
| 7,406,459 B2 | 7/2008 | Chen et al. |
| 7,433,895 B2 | 10/2008 | Li et al. |
| 7,450,740 B2 | 11/2008 | Shah et al. |
| 7,464,086 B2 | 12/2008 | Black et al. |
| 7,519,238 B2 | 4/2009 | Robertson et al. |
| 7,523,102 B2 | 4/2009 | Bjarnestam et al. |
| 7,526,607 B1 | 4/2009 | Singh et al. |
| 7,536,384 B2 | 5/2009 | Venkataraman et al. |
| 7,536,417 B2 | 5/2009 | Walsh et al. |
| 7,542,969 B1 | 6/2009 | Rappaport et al. |
| 7,548,910 B1 | 6/2009 | Chu et al. |
| 7,555,477 B2 | 6/2009 | Bayley et al. |
| 7,555,478 B2 | 6/2009 | Bayley et al. |
| 7,562,076 B2 | 7/2009 | Kapur |
| 7,574,436 B2 | 8/2009 | Kapur et al. |
| 7,574,668 B2 | 8/2009 | Nunez et al. |
| 7,577,656 B2 | 8/2009 | Kawai et al. |
| 7,660,737 B1 | 2/2010 | Lim et al. |
| 7,689,544 B2 | 3/2010 | Koenig |
| 7,694,318 B2 | 4/2010 | Eldering et al. |
| 7,697,791 B1 | 4/2010 | Chan et al. |
| 7,769,221 B1 | 8/2010 | Shakes et al. |
| 7,788,132 B2 | 8/2010 | Desikan et al. |
| 7,788,247 B2 | 8/2010 | Wang et al. |
| 7,836,054 B2 | 11/2010 | Kawai et al. |
| 7,860,895 B1 | 12/2010 | Scofield et al. |
| 7,904,503 B2 | 3/2011 | Van De Sluis |
| 7,920,894 B2 | 4/2011 | Wyler |
| 7,921,107 B2 | 4/2011 | Chang et al. |
| 7,974,994 B2 | 7/2011 | Li et al. |
| 7,987,194 B1 | 7/2011 | Walker et al. |
| 7,991,715 B2 | 8/2011 | Schiff et al. |
| 8,000,655 B2 | 8/2011 | Wang et al. |
| 8,036,893 B2 * | 10/2011 | Reich .................. G10L 15/187 |
| | | | 379/88.05 |
| 8,098,934 B2 | 1/2012 | Vincent et al. |
| 8,266,185 B2 | 9/2012 | Raichelgauz et al. |
| 8,312,031 B2 | 11/2012 | Raichelgauz et al. |
| 8,316,005 B2 | 11/2012 | Moore |
| 8,332,478 B2 | 12/2012 | Levy et al. |
| 8,677,377 B2 | 3/2014 | Cheyer et al. |
| 8,682,667 B2 | 3/2014 | Haughay |
| 8,688,446 B2 | 4/2014 | Yanagihara |
| 8,706,503 B2 | 4/2014 | Cheyer et al. |
| 8,775,442 B2 | 7/2014 | Moore et al. |
| 8,868,619 B2 | 10/2014 | Raichelgauz et al. |
| 8,880,539 B2 | 11/2014 | Raichelgauz et al. |
| 8,880,566 B2 | 11/2014 | Raichelgauz et al. |
| 8,898,568 B2 | 11/2014 | Bull et al. |
| 8,922,414 B2 | 12/2014 | Raichelgauz et al. |
| 8,959,037 B2 | 2/2015 | Raichelgauz et al. |
| 8,990,125 B2 | 3/2015 | Raichelgauz et al. |
| 9,009,086 B2 | 4/2015 | Raichelgauz et al. |
| 9,031,999 B2 | 5/2015 | Raichelgauz et al. |
| 9,087,049 B2 | 7/2015 | Raichelgauz et al. |
| 9,104,747 B2 | 8/2015 | Raichelgauz et al. |
| 9,191,626 B2 | 11/2015 | Raichelgauz et al. |
| 9,197,244 B2 | 11/2015 | Raichelgauz et al. |

(56) References Cited

U.S. PATENT DOCUMENTS

| | | | |
|---|---|---|---|
| 9,218,606 B2 | 12/2015 | Raichelgauz et al. | |
| 9,235,557 B2 | 1/2016 | Raichelgauz et al. | |
| 9,256,668 B2* | 2/2016 | Raichelgauz | G06F 17/3002 |
| 9,330,189 B2 | 5/2016 | Raichelgauz et al. | |
| 2001/0019633 A1 | 9/2001 | Tenze et al. | |
| 2001/0056427 A1 | 12/2001 | Yoon et al. | |
| 2002/0087530 A1 | 7/2002 | Smith et al. | |
| 2002/0107827 A1 | 8/2002 | Benitez-Jimenez et al. | |
| 2002/0123928 A1 | 9/2002 | Eldering et al. | |
| 2002/0126872 A1 | 9/2002 | Brunk et al. | |
| 2002/0143976 A1 | 10/2002 | Barker et al. | |
| 2002/0178410 A1 | 11/2002 | Haitsma et al. | |
| 2003/0028660 A1 | 2/2003 | Igawa et al. | |
| 2003/0041047 A1 | 2/2003 | Chang et al. | |
| 2003/0078766 A1 | 4/2003 | Appelt et al. | |
| 2003/0086627 A1 | 5/2003 | Berriss et al. | |
| 2003/0126147 A1 | 7/2003 | Essafi et al. | |
| 2003/0182567 A1 | 9/2003 | Barton et al. | |
| 2003/0191764 A1 | 10/2003 | Richards | |
| 2003/0200217 A1 | 10/2003 | Ackerman | |
| 2004/0025180 A1 | 2/2004 | Begeja et al. | |
| 2004/0068510 A1 | 4/2004 | Hayes et al. | |
| 2004/0107181 A1 | 6/2004 | Rodden | |
| 2004/0111465 A1 | 6/2004 | Chuang et al. | |
| 2004/0117367 A1 | 6/2004 | Smith et al. | |
| 2004/0128142 A1 | 7/2004 | Whitham | |
| 2004/0128511 A1 | 7/2004 | Sun et al. | |
| 2004/0133927 A1 | 7/2004 | Sternberg et al. | |
| 2004/0153426 A1 | 8/2004 | Nugent | |
| 2004/0249779 A1 | 12/2004 | Nauck et al. | |
| 2004/0260688 A1 | 12/2004 | Gross | |
| 2005/0144455 A1 | 6/2005 | Haitsma | |
| 2005/0177372 A1 | 8/2005 | Wang et al. | |
| 2006/0013451 A1 | 1/2006 | Haitsma | |
| 2006/0020860 A1 | 1/2006 | Tardif et al. | |
| 2006/0026203 A1 | 2/2006 | Tan et al. | |
| 2006/0031216 A1 | 2/2006 | Semple et al. | |
| 2006/0048191 A1 | 3/2006 | Xiong | |
| 2006/0064037 A1 | 3/2006 | Shalon et al. | |
| 2006/0143674 A1 | 6/2006 | Jones et al. | |
| 2006/0153296 A1 | 7/2006 | Deng | |
| 2006/0159442 A1 | 7/2006 | Kim et al. | |
| 2006/0173688 A1 | 8/2006 | Whitham | |
| 2006/0204035 A1 | 9/2006 | Guo et al. | |
| 2006/0236343 A1 | 10/2006 | Chang | |
| 2006/0242139 A1 | 10/2006 | Butterfield et al. | |
| 2006/0242554 A1 | 10/2006 | Gerace et al. | |
| 2006/0248558 A1 | 11/2006 | Barton et al. | |
| 2006/0253423 A1 | 11/2006 | McLane et al. | |
| 2007/0009159 A1 | 1/2007 | Fan | |
| 2007/0011151 A1 | 1/2007 | Hagar et al. | |
| 2007/0038608 A1 | 2/2007 | Chen | |
| 2007/0042757 A1 | 2/2007 | Jung et al. | |
| 2007/0067682 A1 | 3/2007 | Fang | |
| 2007/0071330 A1 | 3/2007 | Oostveen et al. | |
| 2007/0074147 A1 | 3/2007 | Wold | |
| 2007/0130112 A1 | 6/2007 | Lin | |
| 2007/0130159 A1 | 6/2007 | Gulli et al. | |
| 2007/0174320 A1 | 7/2007 | Chou | |
| 2007/0195987 A1 | 8/2007 | Rhoads | |
| 2007/0220573 A1 | 9/2007 | Chiussi et al. | |
| 2007/0244902 A1 | 10/2007 | Seide et al. | |
| 2007/0253594 A1 | 11/2007 | Lu et al. | |
| 2007/0268309 A1 | 11/2007 | Tanigawa et al. | |
| 2007/0282826 A1 | 12/2007 | Hoeber et al. | |
| 2007/0294295 A1 | 12/2007 | Finkelstein et al. | |
| 2008/0019614 A1 | 1/2008 | Robertson et al. | |
| 2008/0040277 A1 | 2/2008 | DeWitt | |
| 2008/0046406 A1 | 2/2008 | Seide et al. | |
| 2008/0049629 A1 | 2/2008 | Morrill | |
| 2008/0072256 A1 | 3/2008 | Boicey et al. | |
| 2008/0091527 A1 | 4/2008 | Silverbrook et al. | |
| 2008/0163288 A1 | 7/2008 | Ghosal et al. | |
| 2008/0165861 A1 | 7/2008 | Wen et al. | |
| 2008/0172615 A1 | 7/2008 | Igelman et al. | |
| 2008/0201299 A1 | 8/2008 | Lehikoinen et al. | |
| 2008/0201314 A1 | 8/2008 | Smith et al. | |
| 2008/0204706 A1 | 8/2008 | Magne et al. | |
| 2008/0253737 A1 | 10/2008 | Kimura et al. | |
| 2008/0270373 A1 | 10/2008 | Oostveen et al. | |
| 2008/0313140 A1* | 12/2008 | Pereira | G06F 17/30858 |
| 2009/0013414 A1 | 1/2009 | Washington et al. | |
| 2009/0037408 A1 | 2/2009 | Rodgers | |
| 2009/0089587 A1* | 4/2009 | Brunk | G06K 9/00744 |
| | | | 713/176 |
| 2009/0119157 A1 | 5/2009 | Dulepet | |
| 2009/0125529 A1 | 5/2009 | Vydiswaran et al. | |
| 2009/0148045 A1 | 6/2009 | Lee et al. | |
| 2009/0172030 A1* | 7/2009 | Schiff | G06Q 30/02 |
| 2009/0175538 A1 | 7/2009 | Bronstein et al. | |
| 2009/0204511 A1 | 8/2009 | Tsang | |
| 2009/0216639 A1 | 8/2009 | Kapczynski et al. | |
| 2009/0245573 A1 | 10/2009 | Saptharishi et al. | |
| 2009/0245603 A1 | 10/2009 | Koruga et al. | |
| 2009/0253583 A1 | 10/2009 | Yoganathan | |
| 2009/0254824 A1 | 10/2009 | Singh | |
| 2009/0277322 A1 | 11/2009 | Cai et al. | |
| 2010/0023400 A1 | 1/2010 | Dewitt | |
| 2010/0042646 A1 | 2/2010 | Raichelgauz et al. | |
| 2010/0082684 A1 | 4/2010 | Churchill et al. | |
| 2010/0088321 A1 | 4/2010 | Solomon et al. | |
| 2010/0104184 A1 | 4/2010 | Bronstein et al. | |
| 2010/0106857 A1 | 4/2010 | Wyler | |
| 2010/0162405 A1 | 6/2010 | Cook et al. | |
| 2010/0173269 A1 | 7/2010 | Puri et al. | |
| 2010/0191567 A1 | 7/2010 | Lee et al. | |
| 2010/0268524 A1 | 10/2010 | Nath et al. | |
| 2010/0306193 A1 | 12/2010 | Pereira et al. | |
| 2010/0318493 A1* | 12/2010 | Wessling | G06F 17/30979 |
| | | | 707/609 |
| 2010/0322522 A1 | 12/2010 | Wang et al. | |
| 2011/0035289 A1 | 2/2011 | King et al. | |
| 2011/0052063 A1 | 3/2011 | McAuley et al. | |
| 2011/0055585 A1 | 3/2011 | Lee | |
| 2011/0106782 A1 | 5/2011 | Ke et al. | |
| 2011/0125727 A1 | 5/2011 | Zou et al. | |
| 2011/0145068 A1 | 6/2011 | King et al. | |
| 2011/0202848 A1 | 8/2011 | Ismalon | |
| 2011/0208822 A1 | 8/2011 | Rathod | |
| 2011/0246566 A1 | 10/2011 | Kashef et al. | |
| 2011/0251896 A1 | 10/2011 | Impollonia et al. | |
| 2011/0313856 A1 | 12/2011 | Cohen et al. | |
| 2012/0131454 A1 | 5/2012 | Shah | |
| 2012/0150890 A1 | 6/2012 | Jeong et al. | |
| 2012/0167133 A1 | 6/2012 | Carroll et al. | |
| 2012/0191686 A1 | 7/2012 | Hjelm et al. | |
| 2012/0197857 A1 | 8/2012 | Huang et al. | |
| 2012/0330869 A1 | 12/2012 | Durham | |
| 2013/0031489 A1 | 1/2013 | Gubin et al. | |
| 2013/0067035 A1 | 3/2013 | Amanat et al. | |
| 2013/0086499 A1 | 4/2013 | Dyor et al. | |
| 2013/0104251 A1 | 4/2013 | Moore et al. | |
| 2013/0173635 A1 | 7/2013 | Sanjeev | |
| 2013/0325550 A1 | 12/2013 | Varghese et al. | |
| 2013/0332951 A1 | 12/2013 | Gharaat et al. | |
| 2014/0019264 A1 | 1/2014 | Wachman et al. | |
| 2014/0147829 A1 | 5/2014 | Jerauld | |
| 2015/0289022 A1 | 10/2015 | Gross | |

OTHER PUBLICATIONS

Boari et al, "Adaptive Routing for Dynamic Applications in Massively Parallel Architectures", 1995 IEEE, Spring 1995.

Burgsteiner et al.: "Movement Prediction From Real-World Images Using a Liquid State Machine", Innovations in Applied Artificial Intelligence Lecture Notes in Computer Science, Lecture Notes in Artificial Intelligence, LNCS, Springer-Verlag, BE, vol. 3533, Jun. 2005, pp. 121-130.

Cernansky et al., "Feed-forward Echo State Networks"; Proceedings of International Joint Conference on Neural Networks, Montreal, Canada, Jul. 31-Aug. 4, 2005.

(56) References Cited

OTHER PUBLICATIONS

Cococcioni, et al, "Automatic Diagnosis of Defects of Rolling Element Bearings Based on Computational Intelligence Techniques", University of Pisa, Pisa, Italy, 2009.
Emami, et al, "Role of Spatiotemporal Oriented Energy Features for Robust Visual Tracking in Video Surveillance, University of Queensland", St. Lucia, Australia, 2012.
Fathy et al., "A Parallel Design and Implementation for Backpropagation Neural Network Using NIMD Architecture", 8th Mediterranean Electrotechnical Corsfe rersce, 19'96. MELECON '96, Date of Conference: May 13-16, 1996, vol. 3, pp. 1472-1475.
Foote, Jonathan et al., "Content-Based Retrieval of Music and Audio"; 1997, Institute of Systems Science, National University of Singapore, Singapore (Abstract).
Freisleben et al., "Recognition of Fractal Images Using a Neural Network", Lecture Notes in Computer Science, 1993, vol. 6861, 1993, pp. 631-637.
Garcia, "Solving the Weighted Region Least Cost Path Problem Using Transputers", Naval Postgraduate School, Monterey, California, Dec. 1989.
Howlett et al., "A Multi-Computer Neural Network Architecture in a Virtual Sensor System Application", International Journal of Knowledge-based Intelligent Engineering Systems, 4 (2). pp. 86-93, 133N 1327-2314.
International Search Authority: "Written Opinion of the International Searching Authority" (PCT Rule 43bis.1) including International Search Report for the related International Patent Application No. PCT/US2008/073852; Date of Mailing: Jan. 28, 2009; Entire Document.
International Search Report for the related International Patent Application PCT/IL2006/001235; Date of Mailing: Nov. 2, 2008.
IPO Examination Report under Section 18(3) for corresponding UK application No. GB1001219.3, dated May 30, 2012.
Iwamoto, K.; Kasutani, E.; Yamada, A.: "Image Signature Robust to Caption Superimposition for Video Sequence Identification"; 2006 IEEE International Conference on Image Processing; pp. 3185-3188, Oct. 8-11, 2006; doi: 10.1109/ICIP.2006.313046.
Jaeger, H.: "The "echo state" approach to analysing and training recurrent neural networks", GMD Report, No. 148, 2001, pp. 1-43, XP002466251. German National Research Center for Information Technology.
Lin, C.; Chang, S.;, "Generating Robust Digital Signature for Image/Video Authentication," Multimedia and Security Workshop at ACM Multimedia '98. Bristol, U.K. Sep. 1998, pp. 49-54.
Lyon, Richard F.; "Computational Models of Neural Auditory Processing"; IEEE International Conference on Acoustics, Speech, and Signal Processing, ICASSP '84, Date of Conference: Mar. 1984, vol. 9, pp. 41-44.
Maass, W. et al.: "Computational Models for Generic Cortical Microcircuits", Institute for Theoretical Computer Science, Technische Universitaet Graz, Graz, Austria, published Jun. 10, 2003.
Mandhaoui, et al, "Emotional Speech Characterization Based on Multi-Features Fusion for Face-to-Face Interaction", Universite Pierre et Marie Curie, Paris, France, 2009.
Marti, et al, "Real Time Speaker Localization and Detection System for Camera Steering in Multiparticipant Videoconferencing Environments", Universidad Politecnica de Valencia, Spain, 2011.
Morad, T.Y. et al.: "Performance, Power Efficiency and Scalability of Asymmetric Cluster Chip Multiprocessors", Computer Architecture Letters, vol. 4, Jul. 4, 2005, pp. 1-4, XP002466254.
Nagy et al, "A Transputer, Based, Flexible, Real-Time Control System for Robotic Manipulators", UKACC International Conference on Control '96, Sep. 2-5, 1996, Conference 1996, Conference Publication No. 427, IEE 1996.
Natsclager, T. et al.: "The "liquid computer": A novel strategy for real-time computing on time series", Special Issue on Foundations of Information Processing of Telematik, vol. 8, No. 1, 2002, pp. 39-43, XP002466253.
Ortiz-Boyer et al., "CIXL2: A Crossover Operator for Evolutionary Algorithms Based on Population Features", Journal of Artificial Intelligence Research 24 (2005) 1-48 Submitted Nov. 2004; published Jul. 2005.
Raichelgauz, I. et al.: "Co-evolutionary Learning in Liquid Architectures", Lecture Notes in Computer Science, [Online] vol. 3512, Jun. 21, 2005, pp. 241-248, XP019010280 Springer Berlin / Heidelberg ISSN: 1611-3349 ISBN: 978-3-540-26208-4.
Ribert et al. "An Incremental Hierarchical Clustering", Visicon Interface 1999, pp. 586-591.
Scheper, et al. "Nonlinear dynamics in neural computation", ESANN'2006 proceedings—European Symposium on Artificial Neural Networks, Bruges (Belgium), Apr. 26-28, 2006, d-side publi, ISBN 2-930307-06-4.
Theodoropoulos et al, "Simulating Asynchronous Architectures on Transputer Networks", Proceedings of the Fourth Euromicro Workshop on Parallel and Distributed Processing, 1996. PDP '96.
Verstraeten et al., "Isolated word recognition with the Liquid State Machine; a case study"; Department of Electronics and Information Systems, Ghent University, Sint-Pietersnieuwstraat 41, 9000 Gent, Belgium, Available online Jul. 14, 2005; Entire Document.
Verstraeten et al.: "Isolated word recognition with the Liquid State Machine; a case study", Information Processing Letters, Amsterdam, NL, col. 95, No. 6, Sep. 30, 2005, pp. 521-528, XP005028093 ISSN: 0020-0190.
Ware et al., "Locating and Identifying Components in a Robot's Workspace using a Hybrid Computer Architecture"; Proceedings of the 1995 IEEE International Symposium on Intelligent Control, Aug. 27-29, 1995, pp. 139-144.
Xian-Sheng Hua et al.: "Robust Video Signature Based on Ordinal Measure" In: 2004 International Conference on Image Processing, ICIP '04; Microsoft Research Asia, Beijing, China; published Oct. 24-27, 2004, pp. 685-688.
Zeevi, Y. et al.: "Natural Signal Classification by Neural Cliques and Phase-Locked Attractors", IEEE World Congress on Computational Intelligence, IJCNN2006, Vancouver, Canada, Jul. 2006, XP002466252.
Zhou et al., "Ensembling neural networks: Many could be better than all"; National Laboratory for Novel Software Technology, Nanjing Unviersirty, Hankou Road 22, Nanjing 210093, PR China; Received Nov. 16, 2001, Available online Mar. 12, 2002.
Zhou et al., "Medical Diagnosis With C4.5 Rule Preceded by Artificial Neural Network Ensemble"; IEEE Transactions on Information Technology in Biomedicine, vol. 7, Issue: 1, pp. 37-42, Date of Publication: Mar. 2003.
Guo et al, "AdOn: An Intelligent Overlay Video Advertising System", SIGIR, Boston, Massachusetts, Jul. 19-23, 2009.
Mei, et al., "Contextual In-Image Advertising", Microsoft Research Asia, pp. 439-448, 2008.
Mei, et al., "VideoSense—Towards Effective Online Video Advertising", Microsoft Research Asia, pp. 1075-1084, 2007.
Semizarov et al. "Specificity of Short Interfering RNA Determined through Gene Expression Signatures", PNAS, 2003, pp. 6347-6352.
Liu, et al., "Instant Mobile Video Search With Layered Audio-Video Indexing and Progressive Transmission", Multimedia, IEEE Transactions on Year: 2014, vol. 16, Issue: 8, pp. 2242-2255, DOI: 10.1109/TMM.2014.2359332 IEEE Journals & Magazines.
Mladenovic, et al., "Electronic Tour Guide for Android Mobile Platform with Multimedia Travel Book", Telecommunications Forum (TELFOR), 2012 20th Year: 2012, pp. 1460-1463, DOI: 10.1109/TELFOR.2012.6419494 IEEE Conference Publications.
Park, et al., "Compact Video Signatures for Near-Duplicate Detection on Mobile Devices", Consumer Electronics (ISCE 2014), The 18th IEEE International Symposium on Year: 2014, pp. 1-2, DOI: 10.1109/ISCE.2014.6884293 IEEE Conference Publications.
Wang et al. "A Signature for Content-based Image Retrieval Using a Geometrical Transform", ACM 1998, pp. 229-234.
Zang, et al., "A New Multimedia Message Customizing Framework for Mobile Devices", Multimedia and Expo, 2007 IEEE International Conference on Year: 2007, pp. 1043-1046, DOI: 10.1109/ICME.2007.4284832 IEEE Conference Publications.
Clement, et al. "Speaker Diarization of Heterogeneous Web Video Files: A Preliminary Study", Acoustics, Speech and Signal Process-

(56) References Cited

OTHER PUBLICATIONS ing (ICASSP), 2011, IEEE International Conference on Year: 2011, pp. 4432-4435, DOI: 10.1109/ICASSP.2011.5947337 IEEE Conference Publications, France.

Gong, et al., "A Knowledge-based Mediator for Dynamic Integration of Heterogeneous Multimedia Information Sources", Video and Speech Processing, 2004, Proceedings of 2004 International Symposium on Year: 2004, pp. 467-470, DOI: 10.1109/ISIMP.2004.1434102 IEEE Conference Publications, Hong Kong.

Li, et al., "Matching Commercial Clips from TV Streams Using a Unique, Robust and Compact Signature," Proceedings of the Digital Imaging Computing: Techniques and Applications, Feb. 2005, vol. 0-7695-2467, Australia.

Lin, et al., "Robust Digital Signature for Multimedia Authentication: A Summary", IEEE Circuits and Systems Magazine, 4th Quarter 2003, pp. 23-26.

Lin, et al., "Summarization of Large Scale Social Network Activity", Acoustics, Speech and Signal Processing, 2009, ICASSP 2009, IEEE International Conference on Year 2009, pp. 3481-3484, DOI: 10.1109/ICASSP.2009.4960375, IEEE Conference Publications, Arizona.

May et al., "The Transputer", Springer-Verlag, Berlin Heidelberg, 1989, teaches multiprocessing system.

Nouza, et al., "Large-scale Processing, Indexing and Search System for Czech Audio-Visual Heritage Archives", Multimedia Signal Processing (MMSP), 2012, pp. 337-342, IEEE 14th Intl. Workshop, DOI: 10.1109/MMSP.2012.6343465, Czech Republic.

Vailaya, et al., "Content-Based Hierarchical Classification of Vacation Images," I.E.E.E.: Multimedia Computing and Systems, vol. 1, 1999, East Lansing, MI, pp. 518-523.

Vallet, et al., "Personalized Content Retrieval in Context Using Ontological Knowledge," IEEE Transactions on Circuits and Systems for Video Technology, vol. 17, No. 3, Mar. 2007, pp. 336-346.

Whitby-Strevens, "The Transputer", 1985 IEEE, Bristol, UK.

Yanai, "Generic Image Classification Using Visual Knowledge on the Web," MM'03, Nov. 2-8, 2003, Tokyo, Japan, pp. 167-176.

Chuan-Yu Cho, et al., "Efficient Motion-Vector-Based Video Search Using Query by Clip", 2004, IEEE, Taiwan, pp. 1-4.

Ihab Al Kabary, et al., "SportSense: Using Motion Queries to Find Scenes in Sports Videos", Oct. 2013, ACM, Switzerland, pp. 1-3.

Jianping Fan et al., "Concept-Oriented Indexing of Video Databases: Towards Semantic Sensitive Retrieval and Browsing", IEEE, vol. 13, No. 7, Jul. 2004, pp. 1-19.

Shin-Fu Chang, et al., "VideoQ: A Fully Automated Video Retrieval System Using Motion Sketches", 1998, IEEE, New York, pp. 1-2.

Wei-Te Li et al., "Exploring Visual and Motion Saliency for Automatic Video Object Extraction", IEEE, vol. 22, No. 7, Jul. 2013, pp. 1-11.

Gomes et al., "Audio Watermaking and Fingerprinting: For Which Applications?" University of Rene Descartes, Paris, France, 2003.

Nam, et al., "Audio Visual Content-Based Violent Scene Characterization", Department of Electrical and Computer Engineering, Minneapolis, MN, 1998, pp. 353-357.

Zhu et al., Technology-Assisted Dietary Assessment. Computational Imaging VI, edited by Charles A. Bouman, Eric L. Miller, Ilya Pollak, Proc. of SPIE-IS&T Electronic Imaging, SPIE vol. 6814, 681411, Copyright 2008 SPIE-IS&T. pp. 1-10.

\* cited by examiner

SYSTEM AND METHOD FOR DETERMINING A PUPILLARY RESPONSE TO A MULTIMEDIA DATA ELEMENT

CROSS-REFERENCE TO RELATED APPLICATIONS

This application claims the benefit of U.S. Provisional Patent Application No. 61/939,289 filed on Feb. 13, 2014. This application is a continuation-in-part (CIP) of U.S. patent application Ser. No. 14/013,636 filed on Aug. 29, 2013, now pending. The Ser. No. 14/013,636 application is a CIP of patent application Ser. No. 13/602,858 filed on Sep. 4, 2012, now U.S. Pat. No. 8,868,619, which is a continuation of U.S. patent application Ser. No. 12/603,123, filed on Oct. 21, 2009, now U.S. Pat. No. 8,266,185. The Ser. No. 12/603,123 application is a continuation-in-part of:

(1) U.S. patent application Ser. No. 12/084,150 having a filing date of Apr. 7, 2009, now U.S. Pat. No. 8,655,801, which is the National Stage of International Application No. PCT/IL2006/001235, filed on Oct. 26, 2006, which claims foreign priority from Israeli Application No. 171577 filed on Oct. 26, 2005, and Israeli Application No. 173409 filed on Jan. 29, 2006;

(2) U.S. patent application Ser. No. 12/195,863, filed on Aug. 21, 2008, now U.S. Pat. No. 8,326,775, which claims priority under 35 USC 119 from Israeli Application No. 185414, filed on Aug. 21, 2007, and which is also a continuation-in-part of the above-referenced U.S. patent application Ser. No. 12/084,150;

(3) U.S. patent application Ser. No. 12/348,888, filed on Jan. 5, 2009, now pending, which is a CIP of the above-referenced U.S. patent application Ser. No. 12/084,150 U.S. patent application Ser. No. 12/195,863; and (4) U.S. patent application Ser. No. 12/538,495, filed on Aug. 10, 2009, now U.S. Pat. No. 8,312,031, which is a CIP of the referenced-above U.S. patent application Ser. No. 12/084,150, the above-referenced U.S. patent application Ser. No. 12/195,863, and the above-referenced U.S. patent application Ser. No. 12/348,888.

All of the referenced-above applications and patents are herein incorporated by reference.

TECHNICAL FIELD

The present disclosure relates generally to the analysis of multimedia content, and more specifically to a system for determining a user attention to displayed multimedia content based on an analysis of sensory inputs performed by a deep-content-classification system.

BACKGROUND

The ubiquity of available access to information using the Internet and the worldwide web (WWW) has naturally drawn the focus of advertisers. As a result, the Internet has also become a popular medium for advertising, where commercials are included in webpages and the advertisers try to understand where to best place their advertisements in order to draw the attention of the users.

Targeting advertisements towards a specific demographic audience is a key component of successful advertising. Many solutions have been developed for gleaning demographic information about Internet users in order for advertisers to target an audience or user that would be more interested in their advertised product. With this aim, the demographic characteristics of the users that tend to visit certain websites are determined in order to place ads targeted to certain demographics, such as age, gender, and the likes of users visiting the websites. Such targeted advertising enables marketing budgets to be spent more effectively.

However, it is common for a group of people with similar demographic characteristics to have different tastes, interests, and preferences. For example, when two persons having similar demographics view an advertisement for a seafood restaurant, one person may like, while the other person may dislike, the advertised product. That is, for a group of people from the same demographic group, each person in the group may have individual preferences not shared with other persons in the group. Furthermore, users' preferences may change over time, thus leaving the advertising content related to the user's previous preferences irrelevant. Therefore, solutions targeting advertisements discussed in the related art cannot provide a sufficiently accurate current indication as to whether or not the user likes or dislikes an advertised content.

Alternate solutions may employ pupillometry as a technique for measuring the interests of users in advertised content effectively target advertisements. As discussed in the related art, pupillometry is the measurement of the diameter of pupils in psychology. For example, "Eye-Opener: Why Do Pupils Dilate in Response to Emotional States" published on Dec. 7, 2012, by Joss Fong discusses pupillometry. The article, quoting Jagdish Sheth, a marketing professor at Emory University, describes pupillometry as a technique for measuring the consumers' responses to television commercials, and was eventually abandoned as a scientific way to establish whether it measured interest or anxiety was not found.

It would be therefore advantageous to provide a solution that would enable determination of the attention of a user to content, such as advertised content using modern pupillometry techniques.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later. For convenience, the term some embodiments may be used herein to refer to a single embodiment or multiple embodiments of the disclosure.

Certain embodiments include a method for determining a pupillary response to a multimedia data element (MMDE) viewed through a user computing device. The method comprises receiving a first image of a viewer's pupil captured prior to display of the MMDE over the user computing device; receiving a second image of a viewer's pupil captured after the display of the MMDE over the user computing device; determining, using the first image and the second image, if the viewer's pupil has been dilated; when identification identifying of a pupil dilation, querying a deep-content-classification (DCC) system to find a match between at least one concept structure and the at least second image of the user's pupil; upon identification of at least one matching concept, receiving a first set of metadata related to the at least one matching concept structure; determining the viewer's attention to the displayed MMDE respective of the first set of metadata; and associating the at least one MMDE with the determined user attention.

Certain embodiments include a system for determining pupillary response to a multimedia data element (MMDE) viewed through a user computing device. The system comprises a processor; and a memory connected to the processor, the memory contains instructions that when executed by the processor, the system is configured to: receive a first image of a viewer's pupil captured prior to display of the MMDE over the user computing device; receive a second image of a viewer's pupil captured after the display of the MMDE over the user computing device; determine, using the first image and the second image, if the viewer's pupil has been dilated; when identifying of a pupil dilation, query a deep-content-classification (DCC) system to find a match between at least one concept structure and the at least second image of the user's pupil; upon identification of at least one matching concept, receive a first set of metadata related to the at least one matching concept structure; determine the viewer's attention to the displayed MMDE respective of the first set of metadata; and associate the at least one MMDE with the determined user attention.

BRIEF DESCRIPTION OF THE DRAWINGS

The subject matter that is disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
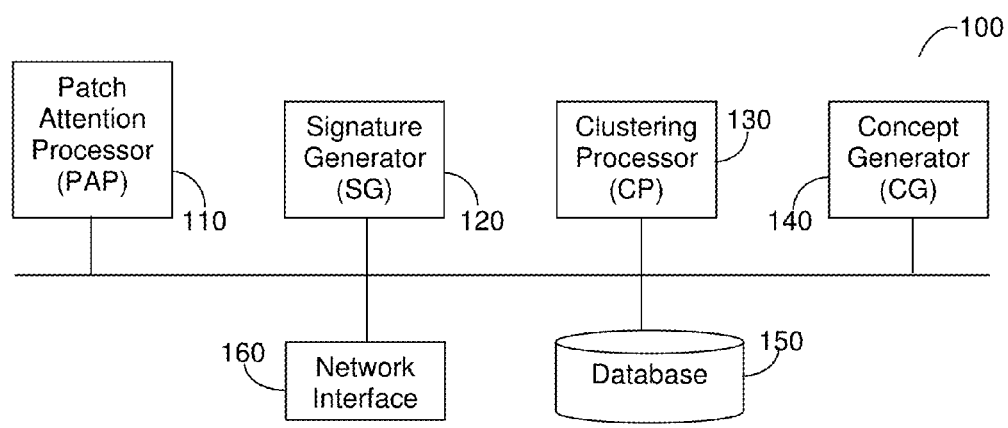
FIG. 1 is a block diagram of a DCC system for creating concept structures utilized to carry some of the disclosed embodiments.

The embodiments disclosed herein are only examples of the many possible advantageous uses and implementations of the innovative teachings presented herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 shows an exemplary and non-limiting diagram of a DCC system 100 for creating concept structures. The DCC system includes a patch attention processor (PAP) 110, a signature generator (SG) 120, a clustering processor (CP) 130, a concept generator (CG) 140, a database (DB) 150, and a network interface 160.

The DCC system 100 is configured to receive multimedia data elements (MMDEs), for example from the Internet via the network interface 160. The MMDEs include, but are not limited to, images, graphics, video streams, video clips, audio streams, audio clips, video frames, photographs, images of signals, combinations thereof, and portions thereof. The images of signals are images such as, but not limited to, medical signals, geophysical signals, subsonic signals, supersonic signals, electromagnetic signals, and infrared signals.

The MMDEs may be stored in a database (DB) 150 or kept in the DB 150 for future retrieval of the respective MMDE. Such a reference may be, but is not limited to, a universal resource locator (URL). Every MMDE in the DB 150, or referenced therefrom, is then processed by a patch attention processor (PAP) 110 resulting in a plurality of patches that are of specific interest, or otherwise of higher interest than other patches. A more general pattern extraction, such as an attention processor (AP) may also be used in lieu of patches. The AP receives an MMDE that is partitioned into items; an item may be an extracted pattern or a patch, or any other applicable partition depending on the type of the MMDE. The functions of the PAP 110 are described herein below in more detail with respect to FIG. 2.

The patches that are of higher interest are then used by the signature generator (SG) 120 to generate signatures respective of the patch. The operation of the signature generator (SG) 120 is described in more detail herein below. The clustering processor (CP) 130 is configured to initiate a process of inter-matching of the signatures once it determines that there are a number of patches that are above a predefined threshold. The threshold may be defined to be large enough to enable proper and meaningful clustering. With a plurality of clusters a process of clustering reduction takes place so as to extract the most useful data about the cluster and keep it at an optimal size to produce meaningful results. The process of cluster reduction is continuous. When new signatures are provided after the initial phase of the operation of the CP 130, the new signatures may be immediately checked against the reduced clusters to save on the operation of the CP 130. A more detailed description of the operation of the CP 130 is provided herein below with respect to FIG. 5.

The concept generator (CG) 140 is configured to create concept structures from the reduced clusters provided by the CP 130. Each concept structure comprises a plurality of metadata associated with the reduced clusters. The result is a compact representation of a concept that can now be easily compared against a MMDE to determine if the received MMDE matches a concept structure stored, for example in the DB 150, by the CG 140. This can be done, for example and without limitation, by providing a query to the DCC system 100 for finding a match between a concept structure and a MMDE. A more detailed description of the operation of the CG 140 is provided herein below.

It should be appreciated that the DCC system 100 can generate a number of concept structures significantly smaller than the number of MMDEs. For example, if one billion ($10^9$) MMDEs need to be checked for a match against another one billion MMDEs, typically the result is that no less than $10^9 \times 10^9 = 10^{18}$ matches have to take place, a daunting undertaking. The DCC system 100 would typically have around 10 million concept structures or less, and therefore at most only $2 \times 10^6 \times 10^9 = 2 \times 10^{15}$ comparisons need to take place, a mere 0.2% of the number of matches that have had to be made by other solutions. As the number of concept structures grows significantly slower than the number of MMDEs, the advantages of the DCC system 100 would be apparent to one with ordinary skill in the art.

The operation of the PAP 110 will now be provided in greater detail with respect to an image as the MMDE. However, this should not be understood as to limit the scope of the disclosed embodiments; other types of MMDEs are specifically included herein and may be handled by the PAP 110.

Figure 2:
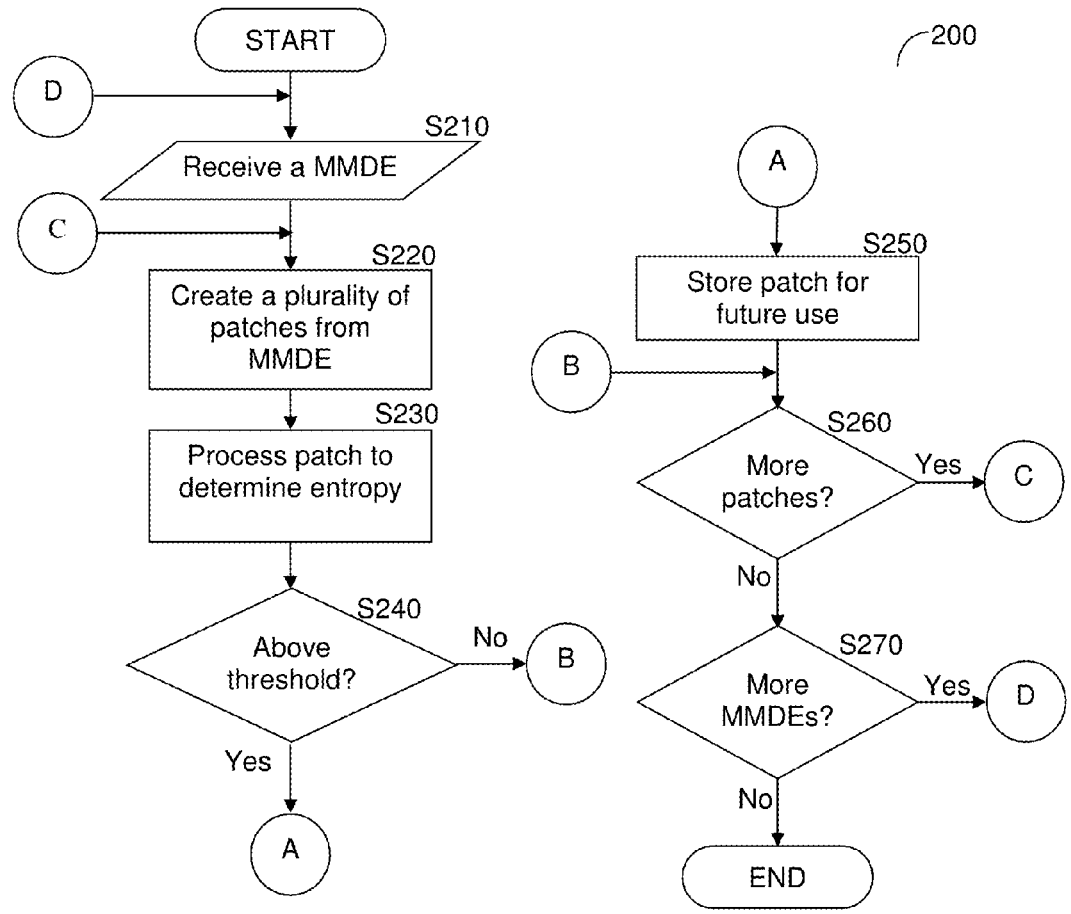
FIG. 2 is a flowchart illustrating the operation of the patch attention processor of the DCC system.

FIG. 2 depicts an exemplary and non-limiting flowchart 200 of the operation of the PAP 110. In S210, a MMDE is received from a source for such MMDEs. Such a source may be a system that feeds the DCC system 100 with MMDEs or other sources for MMDEs, for example the world-wide-web (WWW). In S220, a plurality of patches is created from the MMDE. A patch of an image is defined by, for example, its size, scale, location, and orientation. A patch may be, for example and without limitation, a portion of an image of a size 20 pixels by 20 pixels of an image that is 1,000 pixels by 500 pixels. In the case of audio, a patch may be a segment of audio 0.5 seconds in length from a 5 minute audio clip. In S230, a patch not previously checked is processed to determine its entropy. The entropy is a measure of the amount of interesting information that may be present in the patch. For example, a continuous color of the patch has little interest while sharp edges, corners, or borders will result in higher entropy representing a lot of interesting information. The plurality of statistically independent cores, the operation of which is discussed in more detailed herein below with respect to FIGS. 3 and 4, is used to determine the level-of-interest of the image and a process of voting takes place to determine whether the patch is of interest or not.

In S240, it is checked whether the entropy of the patch was determined to be above a predefined threshold, and if so execution continues with S250; otherwise, execution continues with S260. In S250, the patch having entropy above the threshold is stored for future use by the SG 120 in, for example, DB 150. In S260, it is checked whether there are more patches of the MMDE to be checked, and if so execution continues with S220; otherwise execution continues with S270. In S270, it is checked whether there are additional MMDEs, and if so execution continues with S210; otherwise, execution terminates. It would be appreciated by those of skill in the art that this process reduces the information that must be handled by the DCC system 100 by focusing on areas of interest, i.e. patches of high entropy, in the MMDEs rather than areas that are less meaningful for the formation of a concept structure.

Figure 3:
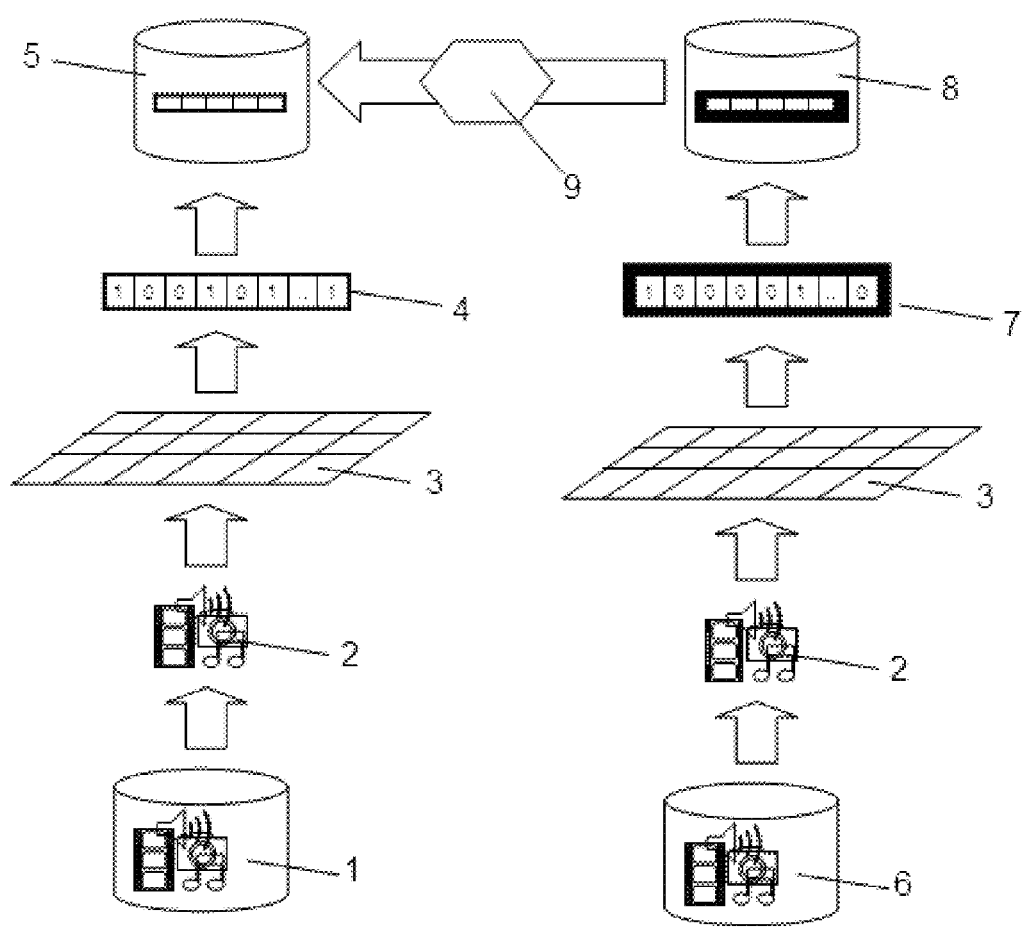
FIG. 3 is a block diagram depicting the basic flow of information in a large-scale video matching system.
Figure 4:
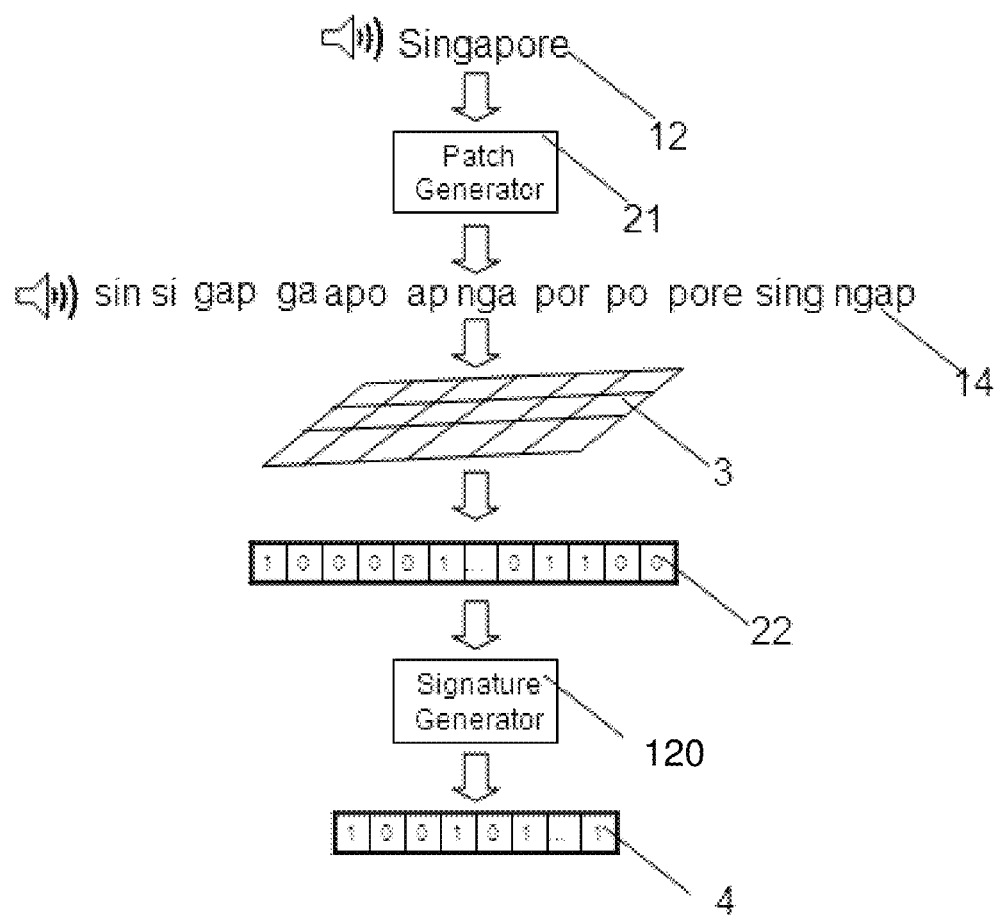
FIG. 4 is a diagram showing the flow of patches generation, response vector generation, and signature generation in a large-scale speech-to-text system.

A high-level description of the process for large scale video matching performed by the Matching System is depicted in FIG. 3. Video content segments 2 from a Master DB 6 and a Target DB 1 are processed in parallel by a large number of independent computational Cores 3 that constitute the Architecture. Further details on the computational Cores generation are provided below. The independent Cores 3 generate a database of Robust Signatures and Signatures 4 for Target content-segments 5 and a database of Robust Signatures and Signatures 7 for Master content-segments 8. An exemplary and non-limiting process of signature generation for an audio component is shown in detail in FIG. 4. Referring back to FIG. 3, at the final step, Target Robust Signatures and/or Signatures are effectively matched, by a matching algorithm 9, to Master Robust Signatures and/or Signatures database to find all matches between the two databases.

A brief description of the operation of the SG 120 is therefore provided, this time with respect to a MMDE which is a sound clip. However, this should not be understood as to limit the scope of the disclosure and other types of MMDEs are specifically included herein and may be handled by SG 120. To demonstrate an example of signature generation process, it is assumed, merely for the sake of simplicity and without limitation on the generality of the disclosed embodiments, that the signatures are based on a single frame, leading to certain simplification of the computational core's generation. The Matching System shown in FIG. 3 is extensible for signatures generation capturing the dynamics in-between the frames and the information of the frame's patches.

The signatures generation process will be described with reference to FIG. 4. The first step in the process of signatures generation from a given speech-segment is to break-down the speech-segment to K patches 14 of random length P and random position within the speech segment 12. The breakdown is performed by the patch generator component 21. The value of K is determined based on optimization, considering the tradeoff between accuracy rate and the number of fast matches required in the flow process of the Matching System. In the next step, all the K patches are injected in parallel to all L computational Cores 3 to generate K response vectors 22. The vectors 22 are fed into the SG 120 to produce a Signatures and Robust Signatures 4.

In order to generate Robust Signatures, i.e., Signatures that are robust to additive noise L (where L is an integer equal to or greater than 1) computational cores are utilized in the Matching System. A frame i is injected into all the Cores. The computational cores 3 generate two binary response vectors: $\vec{S}$ which is a Signature vector, and $\vec{RS}$ which is a Robust Signature vector.

For generation of signatures robust to additive noise, such as White-Gaussian-Noise, scratch, etc., but not robust to distortions, such as crop, shift and rotation, etc., a core $C_i = \{n_i\}$ ($1 \leq i \leq L$) may consist of a single leaky integrate-to-threshold unit (LTU) node or more nodes. The node $n_i$ equations are:

$$V_i = \sum_j w_{ij} k_j$$

$n_i = \Pi(V_i - Th_x)$; $\Pi$ is a Heaviside step function; $w_{ij}$ is a coupling node unit (CNU) between node i and image component j (for example, grayscale value of a certain pixel j); $k_j$ is an image component j (for example, grayscale value of a certain pixel j); $Th_x$ is a constant Threshold value, where x is 'S' for Signature and 'RS' for Robust Signature; and $V_i$ is a Coupling Node Value.

The Threshold values $Th_x$ are set differently for Signature generation and for Robust Signature generation. For example, for a certain distribution of $V_i$ values (for the set of nodes), the thresholds for Signature ($Th_S$) and Robust Signature ($Th_{RS}$) are set apart, after optimization, according to at least one or more of the following criteria:

I: For: $V_i > Th_{RS}$
$1-p(V > Th_S)-1-(1-\epsilon)^l \ll 1$ i.e., given that l nodes (cores) constitute a Robust Signature of a certain image l, the probability that not all of these l nodes will belong to the Signature of same, but noisy image, Ĩ is sufficiently low (according to a system's specified accuracy).

II: $p(V_i > Th_{RS}) \approx l/L$ i.e., approximately l out of the total L nodes can be found to generate Robust Signature according to the above definition.

III: Both Robust Signature and Signature are generated for certain frame i.

It should be understood that the creation of a signature is a unidirectional compression where the characteristics of the compressed data are maintained but the compressed data cannot be reconstructed. Therefore, a signature can be used for the purpose of comparison to another signature without the need of comparison of the original data. The detailed description of the Signature generation can be found U.S. Pat. Nos. 8,326,775 and 8,312,031, assigned to common assignee, which are hereby incorporated by reference for all the useful information they contain.

Computational Core generation is a process of definition, selection and tuning of the Architecture parameters for a certain realization in a specific system and application. The process is based on several design considerations, such as: (a) The Cores should be designed so as to obtain maximal independence, i.e. the projection from a signal space should generate a maximal pair-wise distance between any two Cores' projections into a high-dimensional space; (b) The Cores should be optimally designed for the type of signals, i.e. the Cores should be maximally sensitive to the spatio-temporal structure of the injected signal, for example, and in particular, sensitive to local correlations in time and space. Thus, in some cases a Core represents a dynamic system, such as in state space, phase space, edge of chaos, etc., which is uniquely used herein to exploit their maximal computational power; and (c) The Cores should be optimally designed with regard to invariance to a set of signal distortions, of interest in relevant applications. Detailed description of the Computational Core generation, the computational architecture, and the process for configuring such cores is discussed in more detail in U.S. Pat. No. 8,655,801, assigned to the common assignee.

Hence, signatures are generated by the SG 120 responsive of patches received either from the PAP 110, or retrieved from the DB 150, as discussed hereinabove. It should be noted that other ways for generating signatures may also be used for the purpose of the DCC system 100. Furthermore, as noted above, the array of computational cores may be used by the PAP 110 for the purpose of determining if a patch has an entropy level that is of interest for signature generation according to the principles of the disclosed embodiments. The generated signatures are stored, for example, in the DB 150, with reference to the MMDE and the patch for which it was generated, thereby enabling back annotation as may be necessary.

Portions of the CP 130 have been discussed in detail in the U.S. Pat. No. 8,386,400, entitled "Unsupervised Clustering of Multimedia Data Using a Large-Scale Matching System", assigned to common assignee (the '400 patent), and which is hereby incorporated for all that it contains. In accordance with an embodiment an inter-match process and clustering thereof is utilized. The process can be performed on signatures provided by the SG 120. It should be noted though that this inter-matching and clustering process is merely an example for the operation of the CP 130 and other inter-matching and/or clustering processes may be used for the purpose of the disclosed embodiments.

Following is a brief description of the inter-match and clustering process. The unsupervised clustering process maps a certain content-universe onto a hierarchical structure of clusters. The content-elements of the content-universe are mapped to signatures, when applicable. The signatures of all the content-elements are matched to each other, and consequently generate the inter-match matrix. The described clustering process leads to a set of clusters. Each cluster is represented by a small/compressed number of signatures, for example signatures generated by the SG 120 as further explained hereinabove, which can be increased by variants. This results in a highly compressed representation of the content-universe. A connection graph between the multimedia data elements of a cluster may be stored. The graph can then be used to assist a user searching for data to move along the graph in the search of a desired multimedia data element.

In another embodiment, upon determination of a cluster, a signature for the whole cluster may be generated based on the signatures of the multimedia data elements that belong to the cluster. It should be appreciated that a Bloom filter may be used to reach such signatures. Furthermore, as the signatures are correlated to some extent, the hash functions of the Bloom filter may be replaced by simpler pattern detectors, with the Bloom filter being the upper limit.

While signatures are used here as the basic data elements, it should be realized that other data elements may be clustered using the techniques discussed above. For example, a system generating data items may be used, where the data items generated may be clustered according to the disclosed principles. Such data items may be, without limitation, MMDEs. The clustering process may be performed by dedicated hardware or by using a computing device having storage to store the data items generated by the system and then perform the process described herein above. Then the clusters can be stored in memory for use as may be deemed necessary.

The CP 130 is further configured to use an engine designed to reduce the number of signatures used in a structure, in a sense extracting only the most meaningful signatures that identify the cluster uniquely. This can be done by testing a removal of a signature from a cluster and checking if the MMDEs associated with the cluster still are capable of being recognized by the cluster through signature matching.

The process of signature extraction is ongoing as the DCC system 100 operates. It should be noted that after initialization, and upon signature generation by the SG 120 of a MMDE, the MMDE's respective signature is first checked against the clusters to see if there is a match and if so, it may not be necessary to add the signature to the cluster or clusters but rather simply associate the MMDE with the identified cluster or clusters. However, in some cases where additional refinement of the concept structure is possible, the signature may be added, or at times even replace one or more of the existing signatures in the reduced cluster. If no match is found then the process of inter-matching and clustering may take place.

Figure 5:
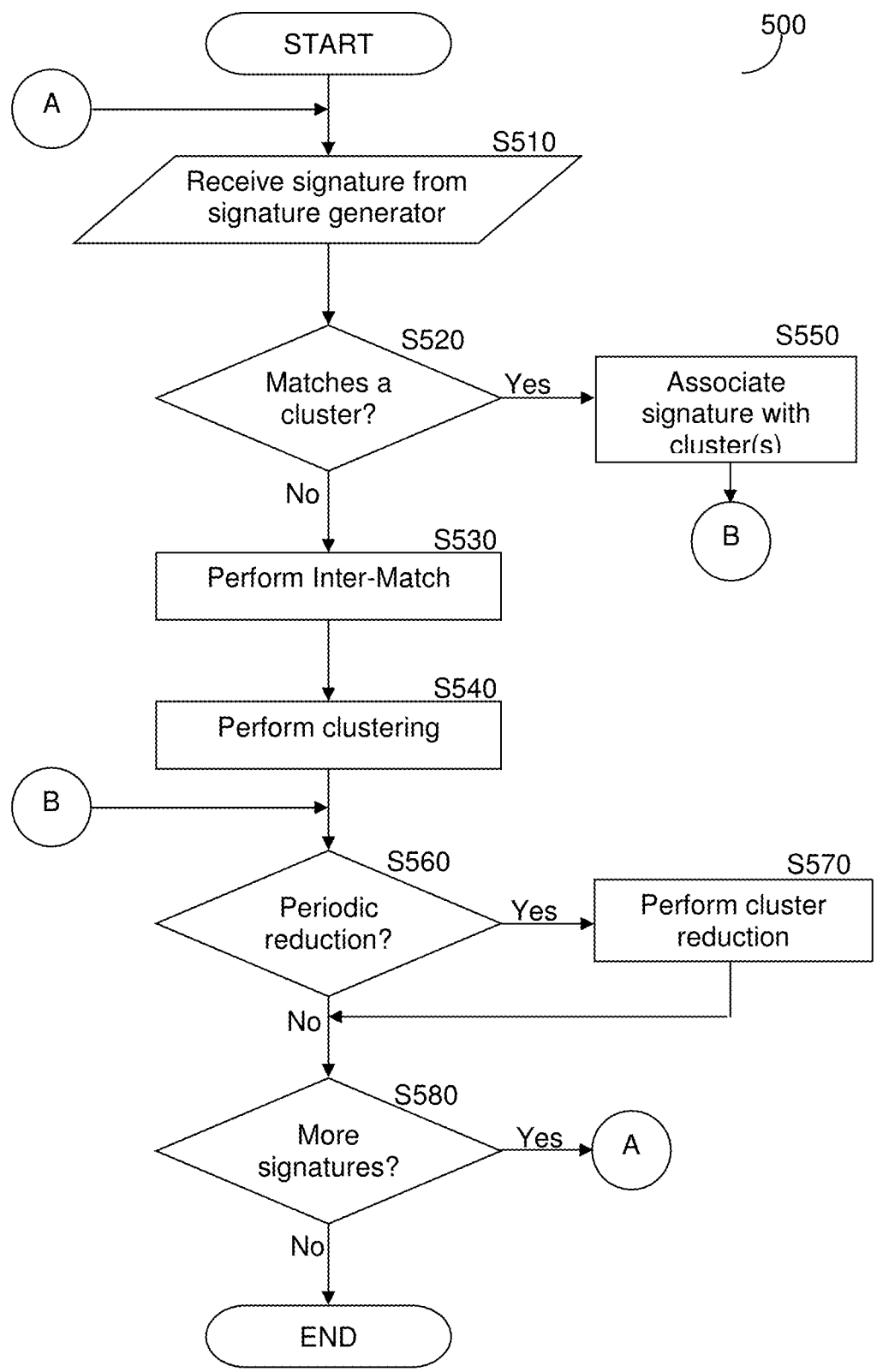
FIG. 5 is a flowchart illustrating the operation of the clustering processor of the DCC system shown in FIG. 1.

FIG. 5 depicts an exemplary and non-limiting flowchart 500 of the operation of the CP 130. In S510, a signature of a MMDE is received, for example from the SG 120. In S520, it is checked whether the signature matches one or more existing clusters and if so execution continues with S550;

otherwise, execution continues with S530. In S530, an inter-match between a plurality of signatures previously received by the DCC system 100 is performed, for example in accordance with the principles of the '400 patent. As may be necessary, the DB 150 may be used to store results or intermediate results, however other memory elements may be used. In S540, a clustering process takes place, for example in accordance with the principles of the '400 patent. As may be necessary, the DB 150 may be used to store results or intermediate results, however other memory elements may be used.

In S550, the signature identified to match one or more clusters is associated with the existing cluster(s). In S560, it is checked whether a periodic cluster reduction is to be performed, and if so execution continues with S570; otherwise, execution continues with S580.

In S570, the cluster reduction process is performed. Specifically, the purpose of the operation is to ensure that in the cluster there remains the minimal number of signatures that still identify all of the MMDEs that are associated with the signature reduced cluster (SRC). This can be performed, for example, by attempting to match the signatures of each of the MMDEs associated with the SRC having one or more signatures removed therefrom. The process of cluster reduction for the purpose of generating SRCs may be performed in parallel and independently of the process described herein above. In such a case, after either S560 or S570 the operation of S580 takes place.

In S580, it is checked whether there are additional signatures to be processed and if so execution continues with S510; otherwise, execution terminates. SRCs may be stored in a memory, such as DB 150, for the purpose of being used by other elements comprising the DCC system 100.

The CG 140 performs two tasks: it associates metadata to the SRCs provided by the CP 130 and it associates between similar clusters based on commonality of metadata. Exemplary and non-limiting methods for associating metadata with MMDEs is described in U.S. patent application Ser. No. 12/348,888, entitled "Methods for Identifying Relevant Metadata for Multimedia Data of a Large-Scale Matching System", filed on Jan. 5, 2009, assigned to common assignee (the "'888 application"), which is hereby incorporated for all that it contains. One embodiment of the '888 application includes a method for identifying and associating metadata to input MMDEs. The method comprises comparing an input first MMDE to at least a second MMDE; collecting metadata of at least the second MMDE when a match is found between the first MMDE and at least the second MMDE; associating at least a subset of the collected metadata to the first MMDE; and storing the first MMDE and the associated metadata in a storage.

Another embodiment of the '888 application includes a system for collecting metadata for a first MMDE. The system comprises a plurality of computational cores enabled to receive the first MMDE, each core having properties to be statistically independent of each other core, each generate responsive to the first MMDE a first signature element and a second signature element, the first signature element being a robust signature; a storage unit for storing at least a second MMDE, metadata associated with the second MMDE, and at least one of a first signature and a second signature associated with the second MMDE, the first signature being a robust signature; and a comparison unit for comparing signatures of MMDEs coupled to the plurality of computational cores and further coupled to the storage unit for the purpose of determining matches between multimedia data elements; wherein responsive to receiving the first MMDE the plurality of computational cores generate a respective first signature of said first MMDE and/or a second signature of said first MMDE, for the purpose of determining a match with at least a second MMDE stored in the storage and associating metadata associated with the at least second MMDE with the first MMDE.

Similar processes to match metadata with a MMDE or signatures thereof may be used. Accordingly, each SRC is associated with metadata which is the combination of the metadata associated with each of the signatures that are included in the respective SRC, preferably without repetition of metadata. A plurality of SRCs having metadata may now be associated to each other based on the metadata and/or partial match of signatures. For example, and without limitation, if the metadata of a first SRC and the metadata of a second SRC overlap more than a predetermined threshold level, for example 50% of the metadata match, they may be considered associated clusters that form a concept structure. Similarly, a second threshold level can be used to determine if there is an association between two SRCs where at least a number of signatures above the second threshold are identified as a match with another SRC. As a practical example, one may want to consider the concept of Abraham Lincoln where images of the late President, and features thereof, appear in a large variety of photographs, drawings, paintings, sculptures, and more and are associated as a concept structure of the concept "Abraham Lincoln". Each concept structure may be then stored in memory, for example the DB 150, for further use.

Figure 6:
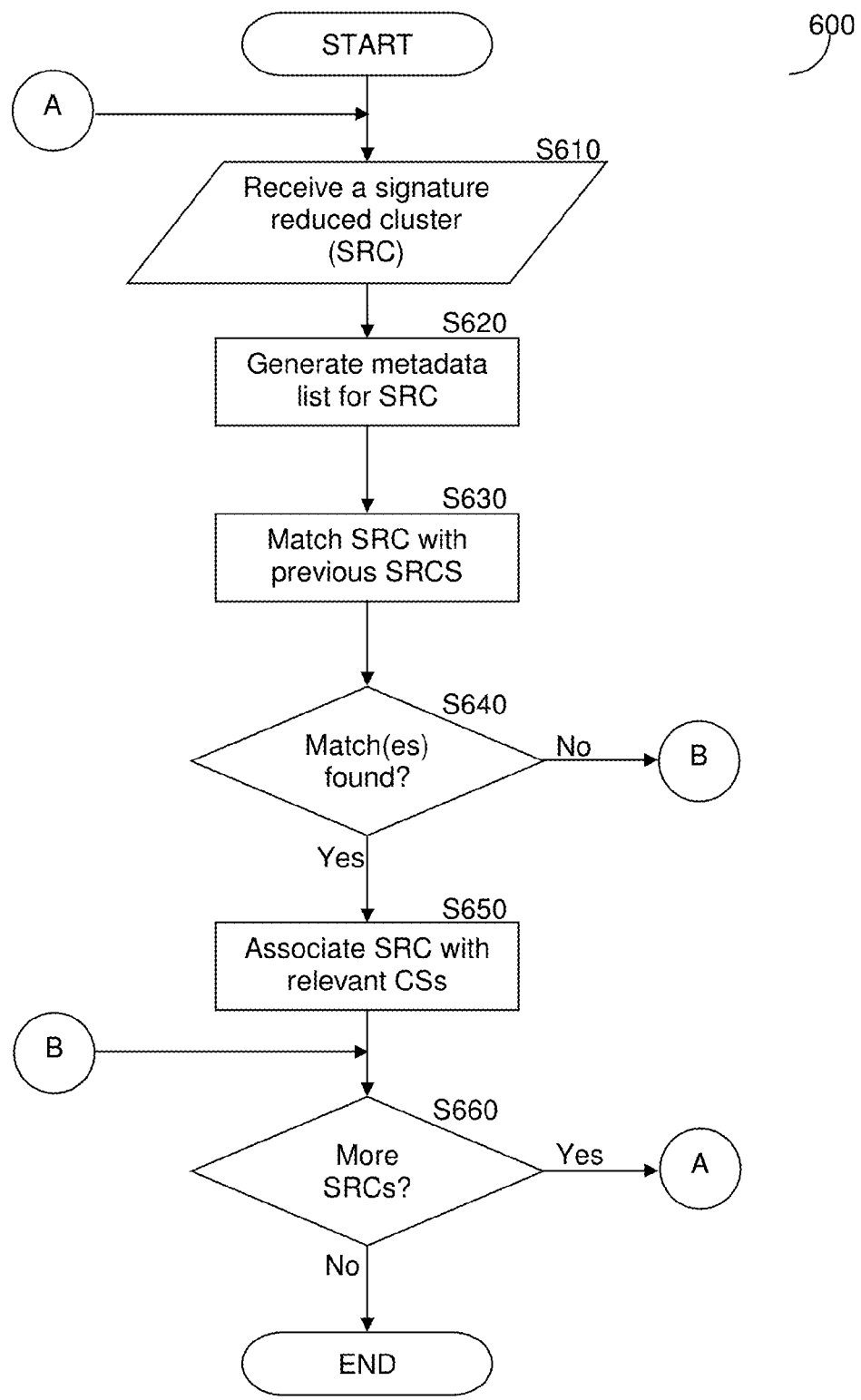
FIG. 6 is a flowchart illustrating the operation of the concept generator of the DCC system shown in FIG. 1.

FIG. 6 shows an exemplary and non-limiting flowchart 600 of the operation of the CG 140. In S610, a SRC is received from either the CP 130 or by accessing memory, for example, the DB 150. In S620, metadata are generated for the signatures of the SRC, for example in accordance with the principles described hereinabove. A list of the metadata is created for the SRC preferably with no metadata duplication. In one embodiment the commonality of metadata is used to signify the strength of the metadata with respect to a signature and/or the SRC, i.e., a higher number of metadata repetitions is of more importance to the SRC than a lower number of repetitions. Furthermore, in one embodiment a threshold may be used to remove those metadata that have a significantly low rate of repetition as not being representative of the SRC.

In S630, the SRC is matched to previously generated SRCs to attempt to find various matches as described, for example, hereinabove in more detail. In S640, it is checked if at least one match was found and if so, execution continues with S650; otherwise, execution continues with S660. In S650, the SRC is associated with one or more of the concept structures to which the SRC has been shown to match. In S660, it is checked whether additional SRCs are to be received and if so execution continues with S610; otherwise, execution terminates.

A person skilled in the art would now appreciate the advantages of the DCC system 100 and methods thereof. The DCC system 100 is configured to create automatically and in an unsupervised fashion concept structures of a wide variety of MMDEs. When checking a new MMDE, it may be checked against the concept structures stored, for example, in the DB 150 and upon detection of a match provide the concept information about the MMDE. When the number of concept structures is significantly lower than the number of MMDEs, the solution is cost effective and scalable for the purpose of identification of content of a MMDE.

Figure 7:
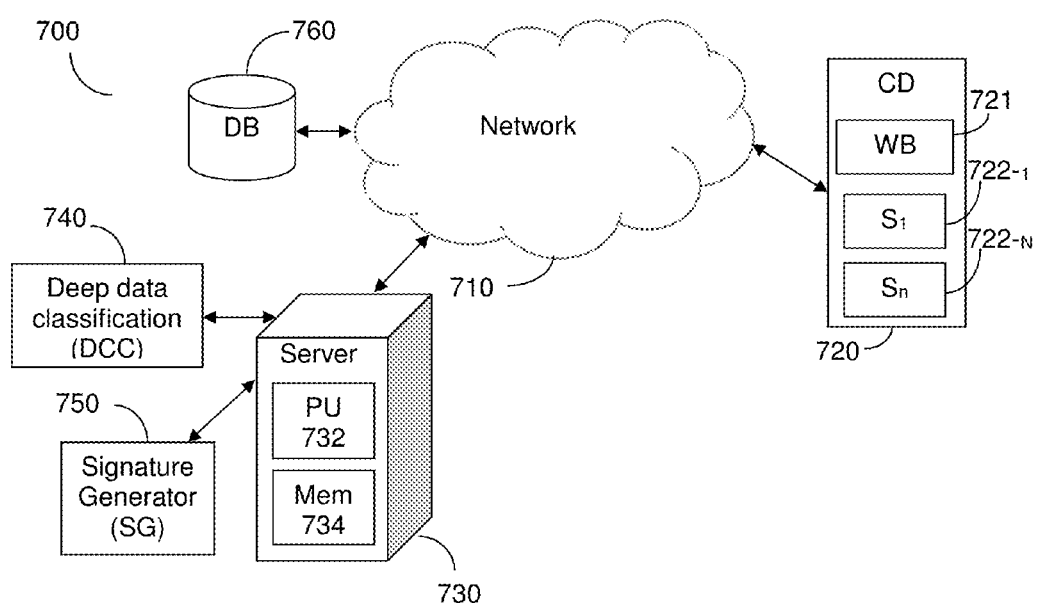
FIG. 7 is a diagram of a network system utilized to describe certain disclosed embodiments.

FIG. 7 shows an exemplary and non-limiting schematic diagram of a network system 700 utilized to describe various disclosed embodiments. A network 710 is used as a means for communication between different elements of the system 700. The network 710 may be the Internet, the world-wide-web (WWW), a local area network (LAN), a wide area network (WAN), a metro area network (MAN), and the like.

At least one computing device 720 is connected to the network 710. The computing device 720 includes at least a program to access the Internet or any other network, such as, but not limited to, a web browser 721. The computing device 720 also includes one or more physical sensors 722-1 through 722-n (collectively referred hereinafter as sensors 722 or individually as a sensor 722, merely for simplicity purposes) configured to capture sensory information. In a preferred embodiment, the sensory information is captured with respect to a MMDE displayed over the web browser 721. Each one of the sensors 722 may be, for example, but not limited to, a camera, a web camera, a microphone, a Global Positioning System (GPS), an image analyzer, a speech recognizer, and the like.

The computing device 720 may be, for example, a personal computer (PC), a personal digital assistant (PDA), a mobile phone, a smartphone, a tablet computer, a wearable computing device, and other kinds of wired and mobile appliances, equipped with browsing, viewing, listening, filtering, and managing capabilities.

Also connected to the network 710 is a server 730 configured to perform the process of determining the user attention to the displayed content. To this end, the server 730 is connected to a DCC system 740 and a signature generator 750. The DCC system 740 is configured and operates as the DCC system 100 discussed in detail above. The signature generator 750 is configured and operates as the SG 120. In certain configurations, the SG of the DCC system 740 is utilized as the signature generator 750. The DCC system 740 and signature generator 750 may be connected through the server 730 to the network 710 or through a direct connection.

In certain configurations, the DCC system 740 and signature generator 750 may be embedded in the server 730. It should be noted that the server 730 typically comprises a processing unit 732 and a memory 734. The processing unit 732 is coupled to the memory 734, which is configured to contain instructions that can be executed by the processing unit. The server 730 also includes a network interface (not shown) to the network 710.

In an embodiment, the processing unit 732 may comprise, or be a component of, a larger processing unit implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing unit 732 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing unit, cause the processing unit to perform the various functions described herein.

According to the embodiments disclosed herein, a user visits a webpage using a web browser 721. When the webpage is uploaded on the user's web browser 721, a request is sent to the server 730 to analyze an identified multimedia content element (the "input MMDE") contained in the webpage. The request to analyze the input MMDE can be generated and sent by a script executed in the webpage, and/or an agent (e.g., plug-in) installed in the web browser 720. The request may include the actual webpage with an identifier of the input MMDE to be processed, a URL of the webpage with an identifier of the input MMDE, or a URL to the element to be analyzed.

In one embodiment, the identification of the input MMDE(s) to be processed is provided by an ad-serving system (not shown). The input MMDE processed by the server 730 may be an image, a graphic, a video stream, a video clip, an audio stream, an audio clip, a video frame, a photograph, and an image of signals (e.g., spectrograms, phasograms, scalograms, etc.), and/or combinations thereof and portions thereof. In one embodiment, the MMDE is a web advertisement.

The request sent from the web browser 721 may also include one or more sensory signals captured by the one or more sensors 722. The sensory signals may be, for example, an audio signal, a video signal, coordinates, a sonography signal, and so on. In one embodiment, the request may include additional parameters, such as an IP address of the computing device, time, date, a browser type, and so on. Such parameters may be used in determining the user's attention and/or to provide supplemental information for the association of the input MMDE and the determined user's attention.

According to the one embodiment, the DCC system 740 is primarily utilized to match between the input MMDE and one more concept structures (or concepts) to determine which the MMDE represents, for example, based on the metadata associated with the matched concept(s). The MMDE may be a sensory signal captured by a sensor 722 and/or multimedia content displayed over a web browser.

Specifically, according to the disclosed embodiments, the web browser 721 is configured to upload webpages or references (e.g., URLs) to the webpages that contain at least one multimedia data element (MMDE). The server 730 is configured to determine the attention of the user of the computing device 720 with respect to the input MMDE displayed in each webpage.

With this aim, the received sensory signal is processed and analyzed for the purpose of matching the sensory signal to concept structures generated and maintained by the DCC system 740. Such a match requires generating at least one signature to the sensory signal and matching the generated signature(s) against the concept structures. The signature for the sensory signal may be generated by means of the signature generator 750. The matching between signatures and concept structures is performed as discussed above.

The metadata of each matching concept structure is further analyzed to determine the attention of the user to the MMDE displayed to the user. As discussed above, the concept is a collection of signatures representing MMDEs and metadata describing the concept. As a non-limiting example, a 'smiley face' concept is a signature reduced cluster of signatures describing multimedia elements related to a smiley face (e.g., to people and cartoons representing smiles and/or happy faces), as well as a set of metadata representing proving textual representation (e.g., happy, amazed, amused, etc.) of the concept.

As a non-limiting example, if the sensory signal is an image of the user having a smile on his/her face, then the sensory signal (or its respective signature) would likely match the 'smiley face' concept. An analysis of the metadata would determine the result that the user attention was positive to the MMDE contained in the webpage sent along the sensory signal.

In one embodiment, if the sensory signal matches more than one concept structure and/or multiple sensory signals are received, the respective metadata of the matched concepts are correlated and then analyzed to determine the user attention. The determined attention is associated with the input MMDE.

In one embodiment, the server 730 is also configured to match the input MMDE to one or more concept structures. The metadata of concept structures matching the webpage's MMDE is correlated to the determined user's attention (or the metadata representing the same). This embodiment provides a general idea on what a particular user would like or dislike. As a non-limiting example, the 'Superman concept' is a signature reduced cluster of signatures describing multimedia elements related to, e.g., to the Superman comic and a set of metadata representing proving textual representation of the Superman concept structure. If the input MMDE is matched to the Superman concept and the user's attention determined with respect to the input MMDE is positive, then the outcome of such correlation would be that the user likes comics in general, and Superman comics in particular. It should be appreciated that using signatures and concept structures as part of the analysis ensures more accurate recognition of the users attention to displayed content, and thus to provide future content (e.g., online ads) that would better fit the user's interest.

In one embodiment, correlation between matching concept structures is performed. This can be achieved by identifying a ratio between signatures' sizes, a spatial location of each signature, and so on using the probabilistic models. In one embodiment, the system 700 further comprises a database, for example the DB 760, which is configured to store the input MMDEs together with the respective user's attention, and any other supplemental information as discussed above.

Figure 8:
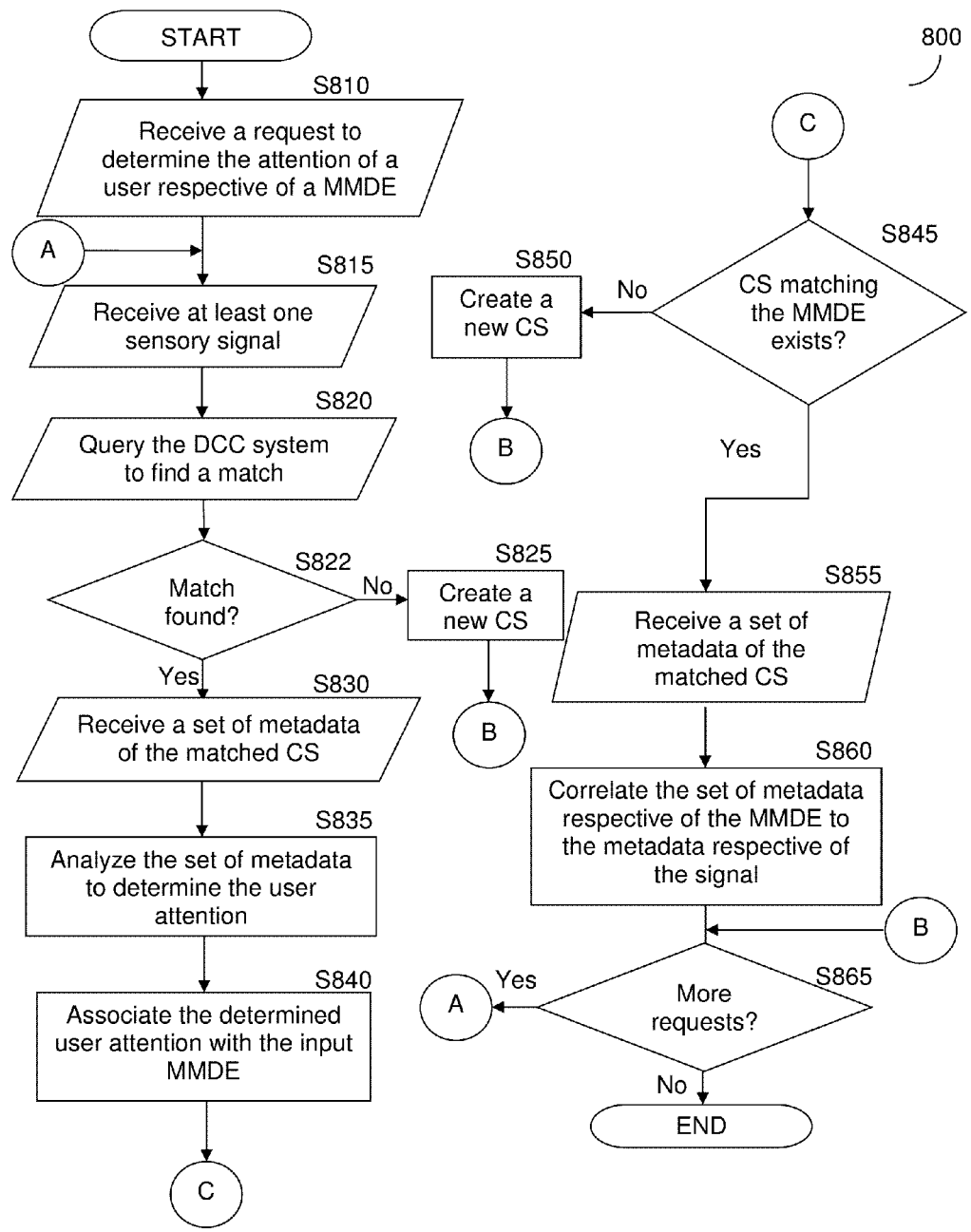
FIG. 8 is a flowchart illustrating a method for determining attention of a user to displayed multimedia content according to an embodiment.

FIG. 8 is a non-limiting and exemplary flowchart 800 describing a method for determining a viewer attention to the displayed multimedia content according to one embodiment. In S810, a request is received to determine the attention of a viewer respective of a MMDE included in the webpage that the viewer (or user) visits over the web browser 721. As noted above, the request may include the actual webpage with an identifier of the input MMDE to be processed, a URL of the webpage with an identifier of the input MMDE, or a URL to the element to be analyzed. The request may also include additional parameters, such as an IP address of the computing device, time, date, a browser type, and so on.

In S815, at least one sensory signal captured by at least one sensor 722 while the viewer viewed the webpage is received. The sensory signal may be, for example, an audio signal, a video signal, coordinates, a sonography signal, and so on. It should be appreciated that the sensory signals are also multimedia signals that can be processed by the DCC system and the signature generator.

In S820, the DCC system (e.g., system 740) is queried to find a match between at least one concept structure (CS) and the received sensory signal. In S822, it is checked if such a match is found, and if so execution continues with S830; otherwise, execution continues with S825. In S825, if a match was not found, the sensory signal is input to the DCC system to create a new concept structure as discussed above and execution continues with S865. In S830, a set of metadata of the matching concept structure is returned.

In S835, the set of returned metadata is analyzed to determine the viewer's attention. As noted above, the metadata provides textual representation of the contents of the concept structure, thus the analysis of the textual representation also determines if at least the viewer's attention with respect to the input MMDE was positive (like), negative (dislike), or natural. Examples for the operation of S835 are provided above with respect to FIG. 7.

In S840, the determined viewer's attention is associated with the input MMDE and such association is saved optionally together with the supplemental information in the DB 760.

Optionally, in S845, a check is made to determine if the input MMDE matches at least one concept structure. The matching between an input MMDE and a concept structure is performed by querying the DCC system. If such a match is found, execution continues with S855 where a set of metadata of the matched concept structure is returned. If a match was not found, execution continues with S850 where the input MMDE is provided to the DCC system to create a new concept structure as discussed above.

In S860, the metadata returned with respect to the input MMDE is correlated with the metadata returned with respect to the sensory signal and/or the determined attention. The correlation outcome provides a general idea about the preferences, tastes, and/or interests of the viewer. In an embodiment, the correlation outcome may be saved, in a database, with an identifier identifying the viewer (e.g., a user name) and/or an identifier identifying the computing device (e.g., an IP address). In S865, it is checked whether there are additional requests and if so, execution continues with S815, otherwise, execution terminates.

Following is another non-limiting example for the operation of the embodiments discussed above. A request to analyze an image shown in a webpage is received. The webpage is viewed by a viewer. In response, at least one signature is generated by the signature generator 750 respective of a kitten shown in the image. In addition, a web camera captures a picture of a viewer. Such a picture is considered as the sensory signal, and as such a signature is generated by the signature generator 750 respective of a facial expression shown in the picture. The signature generated respective of the picture is matched to a concept structure representing positive facial expressions. Respective of the match, the viewer's attention is determined to be positive. As a result, the user positively responds to multimedia content that comprises a kitten, thus the user attention to such multimedia content is determined to be of high interest to the user.

Figure 9:
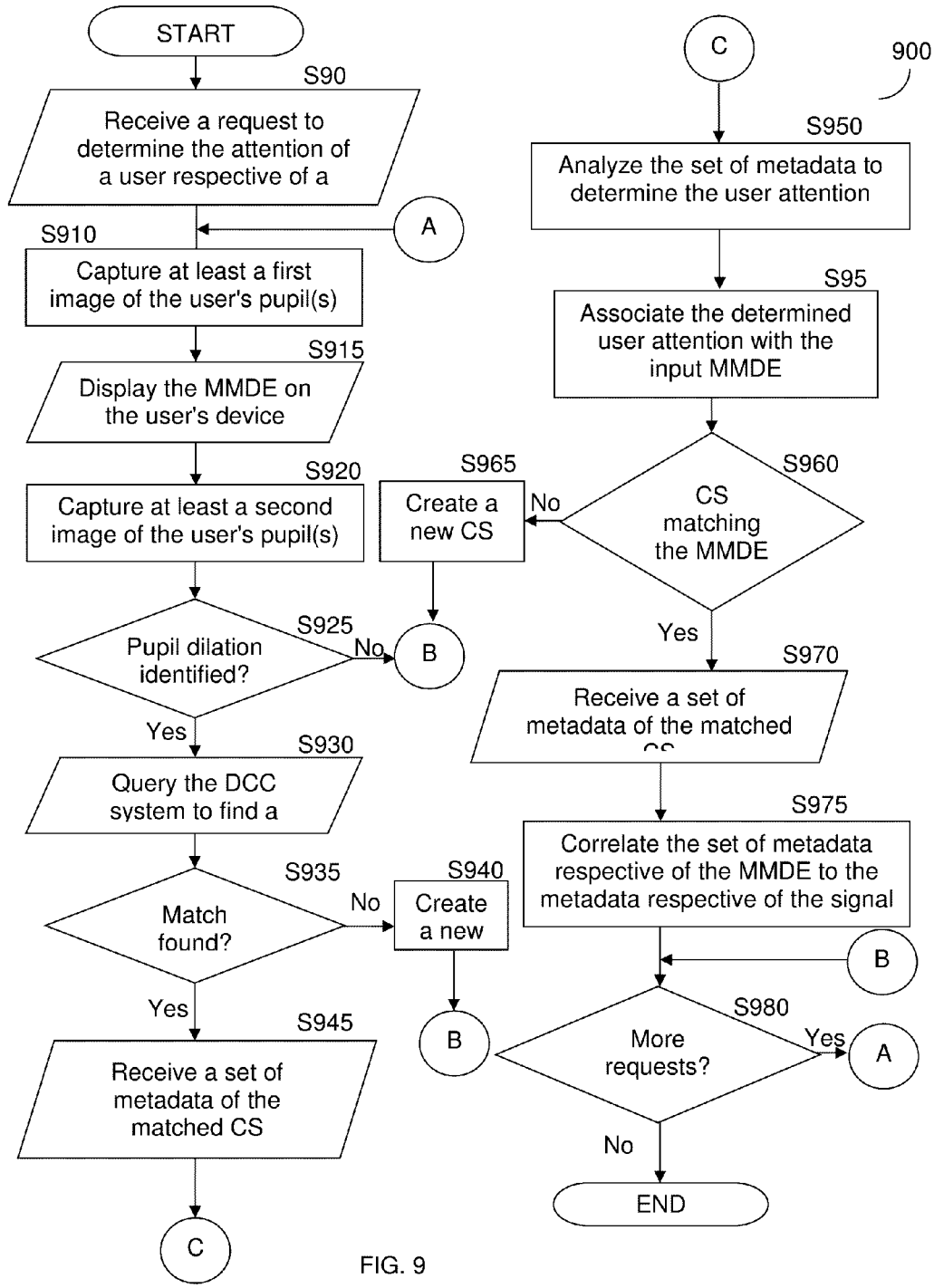
FIG. 9 is a flowchart illustrating a method for determining attention of a user to displayed multimedia content respective of the viewer's pupil dilation according to an embodiment.

FIG. 9 is a non-limiting and exemplary flowchart 900 describing a method for determining attention of a viewer to displayed multimedia content respective of the viewer's pupil dilation in accordance with one embodiment.

In S905, a request is received to determine the attention of a viewer respective of a MMDE. The MMDE may be included in the webpage that a user (or viewer) visits over the web-browser 721, captured through a wearable computing device, for example, a head mounted device, and/or saved in the MMDE in the user computer device or any repository accessed by the computing device. To process the MMDE regardless of its source, the MMDE is displayed on the viewer's computing device. In an embodiment, the MMDE may include an advertised content, such as a banner.

In S910, at least a first image of the viewer's pupil is captured by a sensor installed or accessed by a computing device of the viewer (e.g., sensor 722) before the user views the MMDE. In S915, the MMDE is displayed on the viewer's computing device. In S920, a second image of the viewer's pupil is captured by the sensor while the viewer views the MMDE. It should be noted that either or both of the first image and second image may be a picture of the viewer's face. In such a case, a signature is only generated for one or both of the pupils. It should be noted that a pupil dilation can be determined based on a signature generated for one pupil. Using the first and second images the pupillary response is determined.

Specifically, in S925, it is checked whether a pupil dilation has occurred from the first image to second image of the pupil. That is, if a viewer's pupil is dilated in response to the viewing the MMDE. In an embodiment, S925 may include generating for the each of the first and second image of the viewer's pupil a signature. The signatures are compared to each other to check if they substantially match. If the signatures do not substantially match, then a pupil dilation may have occurred. Another check may be performed to compare the second signature to a concept structure that represents a pupil dilation to confirm a winding of the pupil. A dilated pupil lets more light into the eye and would indicate interest in the subject of attention, i.e., the displayed MMDE.

If S925 results in a positive answer, execution continues with S930; otherwise, execution continues with S980. In S930, the DCC system (e.g., system 740) is queried to find a match between at least one concept structure (CS) and the at least second image or portion thereof showing the viewer's pupil. In S935, it is checked if such a match is found, and if so execution continues with S945; otherwise, execution continues with S940. In S940, if a match was not found, the at least second image of the user's pupil is input to the DCC system 740 to create a new concept structure as discussed above and execution continues with S980. In S945, a set of metadata of the matched concept structure is returned.

In S950, the set of returned metadata is analyzed to determine the user's attention. As noted above, the metadata provides textual representation of the contents of the concept structure, thus the analysis of the textual representation also determines if at least the user's attention with respect to the input MMDE was positive (like), negative (dislike), or natural. As an example, pupil dilation may indicate that a user's autonomic nervous system sympathetic branch is stimulated and therefore the user is under stress. Therefore, the user's attention is determined as negative. In S955, the determined user's attention is associated with the input MMDE and such association is saved optionally together with the supplemental information in the database.

In an embodiment, the attention can be correlated with the input MMDE to determine the preferences of the viewer to the displayed content. For example, if the pupillary response is positive and the input MMDE is a Superman carton, then the correlation would result that the viewer likes comics in general, in particular Superman comics.

To this end, in S960, it is checked whether the input MMDE matches one or more concept structures. If such a match is found, execution continues with S970, where a set of metadata of the matched concept structure is returned. If a match was not found, execution continues with S965 where the input MMDE is provided to the DCC system to create a new concept structure as discussed above and execution continues with S980.

In S975, the metadata returned with respect to the input MMDE is correlated with the metadata returned with respect to the at least second image of the user's pupil and/or the determined attention. As noted above, the correlation outcome provides a general idea about the preferences of the user. The correlation outcome may be saved, in a database, with an identifier identifying the user (e.g., a user name) and/or an identifier identifying the computing device (e.g., an IP address). In S980, it is checked whether there are additional requests and if so, execution continues with S910, otherwise, execution terminates.

The method described with reference to FIGS. 8 and 9 can be performed in part by a server (e.g. the server 730) communicatively connected to the computing device (e.g., device 720) or by the computing device. The computing device is typically operated by a user.

The embodiments disclosed herein may be implemented as hardware, firmware, software, or any combination thereof. Moreover, the software is preferably implemented as an application program tangibly embodied on a program storage unit or non-transitory computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the several embodiments and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What we claim is:

1. A method for determining a pupillary response to a multimedia data element (MMDE) viewed through a user computing device, comprising:
   receiving a first image of a viewer's pupil captured prior to display of the MMDE over the user computing device;
   receiving a second image of a viewer's pupil captured after the display of the MMDE over the user computing device;
   determining, using the first image and the second image, if the viewer's pupil has been dilated;

when identifying of a pupil dilation, querying a deep-content-classification (DCC) system to find a match between at least one concept structure and the at least second image of the user's pupil;

upon identification of at least one matching concept, receiving a first set of metadata related to the at least one matching concept structure;

determining the viewer's attention to the displayed MMDE respective of the first set of metadata; and associating the at least one MMDE with the determined user attention.

2. The method of claim 1, further comprises:
determining preferences of the viewer with respect to the displayed content.

3. The method of claim 1, wherein determining the preferences of the viewer further comprises:
querying the DCC system to find at least one concept structure matching the MMDE;
receiving a second set of metadata related to the at least one matching concept structure of the MMDE; and
correlating the second set of metadata returned respective of the at least one MMDE with at least one of the determined user attention and the first set of metadata.

4. The method of claim 3, wherein each of the first and second set of metadata is a textual representation of multimedia content associated with a respective matching concept structure.

5. The method of claim 1, wherein determining using the first image and the second image if the viewer's pupil has been dilated further comprises:
generating a first signature for the first image;
generating a second signature for the second image;
comparing the first signature to the second signature to determine if the first signature and second signature are substantially matched; and
when the first signature and second signature are substantially matched, determining a pupil dilation.

6. The method of claim 5, further comprising:
comparing the second signature to a signature of a concept structure representing a pupil dilation to confirm a winding of pupil.

7. The method of claim 1, wherein the MMDE is at least one of: an image, graphics, a video stream, a video clip, an audio stream, an audio clip, a video frame, a photograph, images of signals, medical signals, geophysical signals, subsonic signals, supersonic signals, electromagnetic signals, and infrared signals.

8. The method of claim 1, wherein the DCC system comprises:
an attention processor (AP) for generating a plurality of items from the received sensory signal and determining which of the generated items are of interest for signature generation;
a signature generator (SG) for generating at least one signature responsive to at least one item of interest of the sensory signal; and
a concept generator (CG) for matching between the at least one signature generated responsive to at least one item of interest of the sensory signal and a plurality of signature reduced clusters associated with a plurality of cluster structures to identify at least the first set of metadata.

9. The method of claim 1, wherein a concept structure is a signature reduced cluster of signatures describing multimedia elements.

10. A non-transitory computer readable medium having stored thereon instructions for causing one or more processing units to execute the method according to claim 1.

11. A system for determining pupillary response to a multimedia data element (MMDE) viewed through a user computing device, comprising:
a processor; and
a memory connected to the processor, the memory contains instructions that when executed by the processor, the system is configured to:
receive a first image of a viewer's pupil captured prior to display of the MMDE over the user computing device;
receive a second image of a viewer's pupil captured after the display of the MMDE over the user computing device;
determine, using the first image and the second image, if the viewer's pupil has been dilated;
when identifying of a pupil dilation, query a deep-content-classification (DCC) system to find a match between at least one concept structure and the at least second image of the user's pupil;
upon identification of at least one matching concept, receive a first set of metadata related to the at least one matching concept structure;
determine the viewer's attention to the displayed MMDE respective of the first set of metadata; and
associate the at least one MMDE with the determined user attention.

12. The system of claim 11, further configured to:
determine preferences of the viewer with respect to the displayed content.

13. The system of claim 11, wherein when determining the preferences of the viewer the system is further configured to:
query the DCC system to find at least one concept structure matching the MMDE;
receive a second set of metadata related to the at least one matching concept structure of the MMDE; and
correlate the second set of metadata returned respective of the at least one MMDE with at least one of the determined user attention and the first set of metadata.

14. The system of claim 13, wherein each of the first and second set of metadata is a textual representation of multimedia content associated with a respective matching concept structure.

15. The system of claim 11, wherein when determining using the first image and the second image if the viewer's pupil has been dilated the system is further configured to:
generate a first signature for the first image;
generate a second signature for the second image;
compare the first signature to the second signature to determine if the first signature and second signature are substantially matched; and
when the first signature and second signature are substantially matched, determine a pupil dilation.

16. The system of claim 15, further comprising:
compare the second signature to a signature of a concept structure representing a pupil dilation to confirm a winding of pupil.

17. The system of claim 11, wherein the MMDE is at least one of: an image, graphics, a video stream, a video clip, an audio stream, an audio clip, a video frame, a photograph, images of signals, medical signals, geophysical signals, subsonic signals, supersonic signals, electromagnetic signals, and infrared signals.

18. The system of claim 11, wherein the DCC system comprises:

an attention processor (AP) for generating a plurality of items from the received sensory signal and determining which of the generated items are of interest for signature generation;

a signature generator (SG) for generating at least one signature responsive to at least one item of interest of the sensory signal; and a concept generator (CG) for matching between the at least one signature generated responsive to at least one item of interest of the sensory signal and a plurality of signature reduced clusters associated with a plurality of cluster structures to identify at least the first set of metadata.

19. The system of claim 11, wherein a concept structure is a signature reduced cluster of signatures describing multimedia elements.

\* \* \* \* \*